United States Patent
Marr et al.

(10) Patent No.: US 10,376,792 B2
(45) Date of Patent: Aug. 13, 2019

(54) GROUP COMPOSITION MATCHMAKING SYSTEM AND METHOD FOR MULTIPLAYER VIDEO GAMES

(71) Applicant: ACTIVISION PUBLISHING, INC., Santa Monica, CA (US)

(72) Inventors: Michael D. Marr, Monroe, WA (US); Keith S. Kaplan, Bothell, WA (US); Nathan T. Lewis, Woodinville, WA (US)

(73) Assignee: ACTIVISION PUBLISHING, INC., Santa Monica, CA (US)

( * ) Notice: Subject to any disclaimer, the term of this patent is extended or adjusted under 35 U.S.C. 154(b) by 883 days.

(21) Appl. No.: 14/712,608

(22) Filed: May 14, 2015

(65) Prior Publication Data
US 2016/0001186 A1 Jan. 7, 2016

Related U.S. Application Data

(60) Provisional application No. 62/020,732, filed on Jul. 3, 2014, provisional application No. 62/020,739, filed
(Continued)

(51) Int. Cl.
*A63F 9/24* (2006.01)
*A63F 13/00* (2014.01)
(Continued)

(52) U.S. Cl.
CPC ............ *A63F 13/795* (2014.09); *A63F 13/30* (2014.09); *A63F 13/60* (2014.09);
(Continued)

(58) Field of Classification Search
CPC ........ A63F 13/12; A63F 13/48; A63F 13/795; A63F 2300/531; A63F 2300/535;
(Continued)

(56) References Cited

U.S. PATENT DOCUMENTS

| 4,461,301 A | 7/1984 | Ochs |
| 4,908,761 A | 3/1990 | Tai |

(Continued)

FOREIGN PATENT DOCUMENTS

| AU | 768367 | 3/2004 |
| AU | 2005215048 | 10/2011 |

(Continued)

OTHER PUBLICATIONS

Office Action dated Mar. 24, 2017 for U.S. Appl. No. 14/712,514.
(Continued)

*Primary Examiner* — Milap Shah
*Assistant Examiner* — Jason Pinheiro
(74) *Attorney, Agent, or Firm* — Novel IP

(57) ABSTRACT

A system and method is provided that recommends group compositions in multiplayer video games. The system may suggest a composition of a group of players using a matchmaking process. For example, one or more players may wish to form or join a group of players for a given game, but not know what would be an appropriate mix of player styles, player roles, skill levels, and/or other player characteristics that would make an optimal group, given the player's own characteristics. The system may identify optimal groups based on matchmaking related information such as, without limitation, game profile, player profile, prior match scores, prior quality scores, and/or other information. Optimal groups may be those that have performed successfully (e.g., accomplished the most wins, objectives, etc.), are associated with the highest player enjoyment (e.g., based on match and/or quality scores), and/or otherwise are deemed to be desirable.

17 Claims, 9 Drawing Sheets

Related U.S. Application Data on Jul. 3, 2014, provisional application No. 62/020,743, filed on Jul. 3, 2014, provisional application No. 62/020,750, filed on Jul. 3, 2014.

(51) Int. Cl.

| | | |
|---|---|---|
| *G06F 17/00* | (2019.01) | |
| *G06F 19/00* | (2018.01) | |
| *A63F 13/795* | (2014.01) | |
| *A63F 13/30* | (2014.01) | |
| *A63F 13/60* | (2014.01) | |
| *G07F 17/32* | (2006.01) | |
| *A63F 13/847* | (2014.01) | |

(52) U.S. Cl.
CPC ...... *G07F 17/3227* (2013.01); *G07F 17/3237* (2013.01); *G07F 17/3255* (2013.01); *G07F 17/3269* (2013.01); *G07F 17/3272* (2013.01); *A63F 13/847* (2014.09); *A63F 2300/5566* (2013.01); *A63F 2300/575* (2013.01)

(58) Field of Classification Search
CPC ..... A63F 2300/5566; A63F 2300/5593; G07F 17/32; G07F 17/3288
See application file for complete search history.

(56) References Cited

U.S. PATENT DOCUMENTS

| | | |
|---|---|---|
| 5,031,089 A | 7/1991 | Liu |
| 5,058,180 A | 10/1991 | Khan |
| 5,365,360 A | 11/1994 | Torres |
| 5,371,673 A | 12/1994 | Fan |
| 5,432,934 A | 7/1995 | Levin |
| 5,442,569 A | 8/1995 | Osano |
| 5,493,692 A | 2/1996 | Theimer |
| 5,497,186 A | 3/1996 | Kawasaki |
| 5,530,796 A | 6/1996 | Wang |
| 5,539,883 A | 7/1996 | Allon |
| 5,561,736 A | 10/1996 | Moore |
| 5,563,946 A | 10/1996 | Cooper |
| 5,606,702 A | 2/1997 | Diel |
| 5,630,129 A | 5/1997 | Wheat |
| 5,685,775 A | 11/1997 | Bakoglu |
| 5,694,616 A | 12/1997 | Johnson |
| 5,706,507 A | 1/1998 | Schloss |
| 5,708,764 A | 1/1998 | Borrel |
| 5,726,883 A | 3/1998 | Levine |
| 5,736,985 A | 4/1998 | Lection |
| 5,736,990 A | 4/1998 | Barrus |
| 5,737,416 A | 4/1998 | Cooper |
| 5,745,113 A | 4/1998 | Jordan |
| 5,745,678 A | 4/1998 | Herzberg |
| 5,758,079 A | 5/1998 | Ludwig |
| 5,761,083 A | 6/1998 | Brown |
| 5,762,552 A | 6/1998 | Vuong |
| 5,768,511 A | 6/1998 | Galvin |
| 5,774,668 A | 6/1998 | Choquier |
| 5,793,365 A | 8/1998 | Tang |
| 5,825,877 A | 10/1998 | Dan |
| 5,828,839 A | 10/1998 | Moncreiff |
| 5,835,692 A | 11/1998 | Cragun |
| 5,860,137 A | 1/1999 | Raz |
| 5,877,763 A | 3/1999 | Berry |
| 5,878,233 A | 3/1999 | Schloss |
| 5,880,731 A | 3/1999 | Liles |
| 5,883,628 A | 3/1999 | Mullaly |
| 5,900,879 A | 5/1999 | Berry |
| 5,903,266 A | 5/1999 | Berstis |
| 5,903,271 A | 5/1999 | Bardon |
| 5,911,045 A | 6/1999 | Leyba |
| 5,920,325 A | 7/1999 | Morgan |
| 5,920,692 A | 7/1999 | Nguyen |
| 5,920,848 A | 7/1999 | Schutzer |
| 5,923,324 A | 7/1999 | Berry |
| 5,926,100 A | 7/1999 | Escolar |
| 5,933,818 A | 8/1999 | Kasravi |
| 5,938,722 A | 8/1999 | Johnson |
| 5,958,014 A | 9/1999 | Cave |
| 5,969,724 A | 10/1999 | Berry |
| 5,977,979 A | 11/1999 | Clough |
| 5,983,003 A | 11/1999 | Lection |
| 5,990,887 A | 11/1999 | Redpath |
| 5,990,888 A | 11/1999 | Blades |
| 6,006,223 A | 12/1999 | Agrawal |
| 6,008,848 A | 12/1999 | Tiwari |
| 6,009,455 A | 12/1999 | Doyle |
| 6,012,096 A | 1/2000 | Link et al. .................. 709/233 |
| 6,014,145 A | 1/2000 | Bardon |
| 6,018,734 A | 1/2000 | Zhang |
| 6,021,268 A | 2/2000 | Johnson |
| 6,021,496 A | 2/2000 | Dutcher |
| 6,023,729 A * | 2/2000 | Samuel ................ G06Q 30/02 463/42 |
| 6,025,839 A | 2/2000 | Schell |
| 6,032,129 A | 2/2000 | Greef |
| 6,049,819 A | 4/2000 | Buckle |
| 6,058,266 A | 5/2000 | Megiddo |
| 6,059,842 A | 5/2000 | Dumarot |
| 6,067,355 A | 5/2000 | Lim |
| 6,069,632 A | 5/2000 | Mullaly |
| 6,070,143 A | 5/2000 | Barney |
| 6,076,093 A | 6/2000 | Pickering |
| 6,081,270 A | 6/2000 | Berry |
| 6,081,271 A | 6/2000 | Bardon |
| 6,088,727 A | 7/2000 | Hosokawa |
| 6,088,732 A | 7/2000 | Smith |
| 6,091,410 A | 7/2000 | Lection |
| 6,094,196 A | 7/2000 | Berry |
| 6,098,056 A | 8/2000 | Rusnak |
| 6,101,538 A | 8/2000 | Brown |
| 6,104,406 A | 8/2000 | Berry |
| 6,111,581 A | 8/2000 | Berry |
| 6,115,718 A | 9/2000 | Huberman |
| 6,134,588 A | 10/2000 | Guenthner |
| 6,138,128 A | 10/2000 | Perkowitz |
| 6,141,699 A | 10/2000 | Luzzi |
| 6,144,381 A | 11/2000 | Lection |
| 6,148,294 A | 11/2000 | Beyda |
| 6,148,328 A | 11/2000 | Cuomo |
| 6,157,953 A | 12/2000 | Chang |
| 6,177,932 B1 | 1/2001 | Galdes |
| 6,179,713 B1 | 1/2001 | James |
| 6,182,067 B1 | 1/2001 | Presnell |
| 6,185,614 B1 | 2/2001 | Cuomo |
| 6,195,657 B1 | 2/2001 | Rucker |
| 6,199,067 B1 | 3/2001 | Geller |
| 6,201,881 B1 | 3/2001 | Masuda |
| 6,212,494 B1 | 4/2001 | Boguraev |
| 6,212,548 B1 | 4/2001 | Desimone |
| 6,216,098 B1 | 4/2001 | Clancey |
| 6,222,551 B1 | 4/2001 | Schneider |
| 6,226,686 B1 | 5/2001 | Rothschild |
| 6,233,583 B1 | 5/2001 | Hoth |
| 6,249,779 B1 | 6/2001 | Hitt |
| 6,266,649 B1 | 7/2001 | Linden |
| 6,271,842 B1 | 8/2001 | Bardon |
| 6,271,843 B1 | 8/2001 | Lection |
| 6,275,820 B1 | 8/2001 | Navin-Chandra |
| 6,282,547 B1 | 8/2001 | Hirsch |
| 6,293,865 B1 | 9/2001 | Kelly |
| 6,301,609 B1 | 10/2001 | Aravamudan et al. |
| 6,308,208 B1 | 10/2001 | Jung |
| 6,311,206 B1 | 10/2001 | Malkin |
| 6,314,465 B1 | 11/2001 | Paul |
| 6,330,281 B1 | 12/2001 | Mann |
| 6,334,127 B1 | 12/2001 | Bieganski |
| 6,334,141 B1 | 12/2001 | Varma |
| 6,336,134 B1 | 1/2002 | Varma |
| 6,337,700 B1 | 1/2002 | Kinoe |
| 6,345,264 B1 | 2/2002 | Breese |
| 6,345,287 B1 | 2/2002 | Fong |
| 6,349,091 B1 | 2/2002 | Li |

(56) References Cited

U.S. PATENT DOCUMENTS

| | | |
|---|---|---|
| 6,351,775 B1 | 2/2002 | Yu |
| 6,353,449 B1 | 3/2002 | Gregg |
| 6,356,297 B1 | 3/2002 | Cheng |
| 6,360,254 B1 | 3/2002 | Linden |
| 6,363,174 B1 | 3/2002 | Lu |
| 6,370,560 B1 | 4/2002 | Robertazzi |
| 6,396,513 B1 | 5/2002 | Helfman |
| 6,411,312 B1 | 6/2002 | Sheppard |
| 6,418,424 B1 | 7/2002 | Hoffberg |
| 6,418,462 B1 | 7/2002 | Xu |
| 6,426,757 B1 | 7/2002 | Smith |
| 6,445,389 B1 | 9/2002 | Bossen |
| 6,452,593 B1 | 9/2002 | Challener |
| 6,462,760 B1 | 10/2002 | Cox, Jr. |
| 6,463,078 B1 | 10/2002 | Engstrom et al. ............ 370/466 |
| 6,466,550 B1 | 10/2002 | Foster |
| 6,469,712 B1 | 10/2002 | Hilpert, Jr. |
| 6,473,085 B1 | 10/2002 | Brock |
| 6,473,103 B1 | 10/2002 | Bailey |
| 6,473,597 B1 | 10/2002 | Johnson |
| 6,476,830 B1 | 11/2002 | Farmer |
| 6,499,053 B1 | 12/2002 | Marquette |
| 6,501,834 B1 | 12/2002 | Milewski |
| 6,505,208 B1 | 1/2003 | Kanevsky |
| 6,509,925 B1 | 1/2003 | Dermler |
| 6,525,731 B1 | 2/2003 | Suits |
| 6,539,415 B1 | 3/2003 | Mercs |
| 6,549,933 B1 | 4/2003 | Barrett |
| 6,559,863 B1 | 5/2003 | Megiddo |
| 6,567,109 B1 | 5/2003 | Todd |
| 6,567,813 B1 | 5/2003 | Zhu |
| 6,574,477 B1 | 6/2003 | Rathunde |
| 6,580,981 B1 | 6/2003 | Masood |
| 6,594,673 B1 | 7/2003 | Smith |
| 6,601,084 B1 | 7/2003 | Bhaskaran |
| 6,618,751 B1 | 9/2003 | Challenger |
| 6,640,230 B1 | 10/2003 | Alexander |
| 6,641,481 B1 | 11/2003 | Mai et al. .................. 463/42 |
| 6,645,153 B2 | 11/2003 | Kroll |
| RE38,375 E | 12/2003 | Herzberg |
| 6,657,617 B2 | 12/2003 | Paolini |
| 6,657,642 B1 | 12/2003 | Bardon |
| 6,684,255 B1 | 1/2004 | Martin |
| 6,717,600 B2 | 4/2004 | Dutta |
| 6,734,884 B1 | 5/2004 | Berry |
| 6,742,032 B1 | 5/2004 | Castellani |
| 6,765,596 B2 | 7/2004 | Lection |
| 6,781,607 B1 | 8/2004 | Benham |
| 6,801,930 B1 | 10/2004 | Dionne |
| 6,807,562 B1 | 10/2004 | Pennock |
| 6,819,669 B2 | 11/2004 | Rooney |
| 6,832,239 B1 | 12/2004 | Kraft |
| 6,836,480 B2 | 12/2004 | Basso |
| 6,845,389 B1 | 1/2005 | Sen |
| 6,854,007 B1 | 2/2005 | Hammond |
| 6,886,026 B1 | 4/2005 | Hanson |
| 6,901,379 B1 | 5/2005 | Balter |
| 6,941,236 B2 | 9/2005 | Huelsbergen |
| 6,948,168 B1 | 9/2005 | Kuprionas |
| RE38,865 E | 11/2005 | Dumarot |
| 6,970,929 B2 | 11/2005 | Bae |
| 6,993,596 B2 | 1/2006 | Hinton |
| 7,006,616 B1 | 2/2006 | Christofferson |
| 7,028,296 B2 | 4/2006 | Irfan |
| 7,031,473 B2 | 4/2006 | Morais et al. ................ 380/251 |
| 7,050,868 B1 | 5/2006 | Graepel et al. .................. 700/93 |
| 7,062,533 B2 | 6/2006 | Brown |
| 7,089,266 B2 | 8/2006 | Stolte |
| 7,124,071 B2 | 10/2006 | Rich |
| 7,124,164 B1 | 10/2006 | Chemtob |
| 7,139,792 B1 | 11/2006 | Mishra |
| 7,143,409 B2 | 11/2006 | Herrero |
| 7,159,217 B2 | 1/2007 | Pulsipher |
| 7,185,067 B1 | 2/2007 | Viswanath |
| 7,192,352 B2 | 3/2007 | Walker |
| 7,209,137 B2 | 4/2007 | Brokenshire |
| 7,230,616 B2 | 6/2007 | Taubin |
| 7,240,093 B1 | 7/2007 | Danieli |
| 7,249,123 B2 | 7/2007 | Elder |
| 7,263,511 B2 | 8/2007 | Bodin |
| 7,278,108 B2 | 10/2007 | Duarte |
| 7,287,053 B2 | 10/2007 | Bodin |
| 7,292,870 B2 | 11/2007 | Heredia |
| 7,305,438 B2 | 12/2007 | Christensen |
| 7,308,476 B2 | 12/2007 | Mannaru |
| 7,314,411 B2 | 1/2008 | Lannert |
| 7,328,242 B1 | 2/2008 | McCarthy |
| 7,353,295 B1 | 4/2008 | Crow |
| 7,376,474 B2 | 5/2008 | Graepel et al. ................. 700/93 |
| 7,383,307 B2 | 6/2008 | Kirkland |
| 7,404,149 B2 | 7/2008 | Fox |
| 7,426,538 B2 | 9/2008 | Bodin |
| 7,427,980 B1 | 9/2008 | Partridge |
| 7,428,588 B2 | 9/2008 | Berstis |
| 7,429,987 B2 | 9/2008 | Leah |
| 7,436,407 B2 | 10/2008 | Doi |
| 7,439,975 B2 | 10/2008 | Hsu |
| 7,443,393 B2 | 10/2008 | Shen |
| 7,447,996 B1 | 11/2008 | Cox |
| 7,467,180 B2 | 12/2008 | Kaufman |
| 7,467,181 B2 | 12/2008 | McGowan |
| 7,475,354 B2 | 1/2009 | Guido |
| 7,478,127 B2 | 1/2009 | Creamer |
| 7,484,012 B2 | 1/2009 | Hinton |
| 7,503,007 B2 | 3/2009 | Goodman |
| 7,506,264 B2 | 3/2009 | Polan |
| 7,509,388 B2 | 3/2009 | Allen |
| 7,515,136 B1 | 4/2009 | Kanevsky |
| 7,525,964 B2 | 4/2009 | Astley |
| 7,527,191 B2 | 5/2009 | Takayama |
| 7,552,177 B2 | 6/2009 | Kessen |
| 7,565,650 B2 | 7/2009 | Bhogal |
| 7,571,224 B2 | 8/2009 | Childress |
| 7,571,389 B2 | 8/2009 | Broussard |
| 7,580,888 B2 | 8/2009 | Ur |
| 7,590,984 B2 | 9/2009 | Kaufman |
| 7,596,596 B2 | 9/2009 | Chen |
| 7,614,955 B2 * | 11/2009 | Farnham ............... A63F 13/12<br>463/29 |
| 7,617,283 B2 | 11/2009 | Aaron |
| 7,640,587 B2 | 12/2009 | Fox |
| 7,667,701 B2 | 2/2010 | Leah |
| 7,677,970 B2 * | 3/2010 | O'Kelley, II ......... A63F 13/795<br>463/23 |
| 7,698,656 B2 | 4/2010 | Srivastava |
| 7,702,730 B2 | 4/2010 | Spataro |
| 7,702,784 B2 | 4/2010 | Berstis |
| 7,714,867 B2 | 5/2010 | Doi |
| 7,719,532 B2 | 5/2010 | Schardt |
| 7,719,535 B2 | 5/2010 | Tadokoro |
| 7,734,691 B2 | 6/2010 | Creamer |
| 7,737,969 B2 | 6/2010 | Shen |
| 7,743,095 B2 | 6/2010 | Goldberg |
| 7,747,679 B2 | 6/2010 | Galvin |
| 7,765,478 B2 | 7/2010 | Reed |
| 7,768,514 B2 | 8/2010 | Pagan |
| 7,770,114 B2 | 8/2010 | Sriprakash |
| 7,773,087 B2 | 8/2010 | Fowler |
| 7,774,407 B2 | 8/2010 | Daly |
| 7,780,525 B2 | 8/2010 | Walker |
| 7,782,318 B2 | 8/2010 | Shearer |
| 7,792,263 B2 | 9/2010 | D Amora |
| 7,792,801 B2 | 9/2010 | Hamilton, II |
| 7,796,128 B2 | 9/2010 | Radzikowski |
| 7,808,500 B2 | 10/2010 | Shearer |
| 7,814,152 B2 | 10/2010 | McGowan |
| 7,827,318 B2 | 11/2010 | Hinton |
| 7,843,471 B2 | 11/2010 | Doan |
| 7,844,663 B2 | 11/2010 | Boutboul |
| 7,844,673 B2 | 11/2010 | Bostick |
| 7,846,024 B2 * | 12/2010 | Graepel ............ G07F 17/3276<br>463/42 |
| 7,847,799 B2 | 12/2010 | Taubin |
| 7,853,594 B2 | 12/2010 | Elder |

(56) References Cited

U.S. PATENT DOCUMENTS

| | | | |
|---|---|---|---|
| 7,856,469 B2 | 12/2010 | Chen | |
| 7,865,393 B2 | 1/2011 | Leason | |
| 7,873,485 B2 | 1/2011 | Castelli | |
| 7,882,222 B2 | 2/2011 | Dolbier | |
| 7,882,243 B2 | 2/2011 | Ivory | |
| 7,884,819 B2 | 2/2011 | Kuesel | |
| 7,886,045 B2 | 2/2011 | Bates | |
| 7,890,623 B2 | 2/2011 | Bates | |
| 7,893,936 B2 | 2/2011 | Shearer | |
| 7,904,829 B2 | 3/2011 | Fox | |
| 7,921,128 B2 | 4/2011 | Hamilton, II | |
| 7,940,265 B2 | 5/2011 | Brown | |
| 7,945,620 B2 | 5/2011 | Bou-Ghannam | |
| 7,945,802 B2 | 5/2011 | Hamilton, II | |
| 7,955,171 B2 | 6/2011 | Jorasch | |
| 7,970,837 B2 | 6/2011 | Lyle | |
| 7,970,840 B2 | 6/2011 | Cannon et al. | |
| 7,985,132 B2 | 7/2011 | Walker | |
| 7,985,138 B2 | 7/2011 | Acharya | |
| 7,990,387 B2 | 8/2011 | Hamilton, II | |
| 7,996,164 B2 | 8/2011 | Hamilton, II | |
| 7,997,987 B2 * | 8/2011 | Johnson | A63F 13/12 463/40 |
| 8,001,161 B2 | 8/2011 | Finn | |
| 8,004,518 B2 | 8/2011 | Fowler | |
| 8,005,025 B2 | 8/2011 | Bodin | |
| 8,006,182 B2 | 8/2011 | Bates | |
| 8,013,861 B2 | 9/2011 | Hamilton, II | |
| 8,018,453 B2 | 9/2011 | Fowler | |
| 8,018,462 B2 | 9/2011 | Bhogal | |
| 8,019,797 B2 | 9/2011 | Hamilton, II | |
| 8,019,858 B2 | 9/2011 | Bauchot | |
| 8,022,948 B2 | 9/2011 | Garbow | |
| 8,022,950 B2 | 9/2011 | Brown | |
| 8,026,913 B2 | 9/2011 | Garbow | |
| 8,028,021 B2 | 9/2011 | Reisinger | |
| 8,028,022 B2 | 9/2011 | Brownholtz | |
| 8,037,416 B2 | 10/2011 | Bates | |
| 8,041,614 B2 | 10/2011 | Bhogal | |
| 8,046,700 B2 | 10/2011 | Bates | |
| 8,051,462 B2 | 11/2011 | Hamilton, II | |
| 8,055,656 B2 | 11/2011 | Cradick | |
| 8,056,121 B2 | 11/2011 | Hamilton, II | |
| 8,057,307 B2 | 11/2011 | Berstis | |
| 8,062,130 B2 | 11/2011 | Smith | |
| 8,063,905 B2 | 11/2011 | Brown | |
| 8,070,601 B2 | 12/2011 | Acharya | |
| 8,082,245 B2 | 12/2011 | Bates | |
| 8,085,267 B2 | 12/2011 | Brown | |
| 8,089,481 B2 | 1/2012 | Shearer | |
| 8,092,288 B2 | 1/2012 | Theis | |
| 8,095,881 B2 | 1/2012 | Reisinger | |
| 8,099,338 B2 | 1/2012 | Betzler | |
| 8,099,668 B2 | 1/2012 | Garbow | |
| 8,102,334 B2 | 1/2012 | Brown | |
| 8,103,640 B2 | 1/2012 | Lo | |
| 8,103,959 B2 | 1/2012 | Cannon | |
| 8,105,165 B2 | 1/2012 | Karstens | |
| 8,108,774 B2 | 1/2012 | Finn | |
| 8,113,959 B2 | 2/2012 | De Judicibus | |
| 8,117,551 B2 | 2/2012 | Cheng | |
| 8,125,485 B2 | 2/2012 | Brown | |
| 8,127,235 B2 | 2/2012 | Haggar | |
| 8,127,236 B2 | 2/2012 | Hamilton, II | |
| 8,128,487 B2 | 3/2012 | Hamilton, II | |
| 8,131,740 B2 | 3/2012 | Cradick | |
| 8,132,235 B2 | 3/2012 | Bussani | |
| 8,134,560 B2 | 3/2012 | Bates | |
| 8,139,060 B2 | 3/2012 | Brown | |
| 8,139,780 B2 | 3/2012 | Shearer | |
| 8,140,340 B2 | 3/2012 | Bhogal | |
| 8,140,620 B2 | 3/2012 | Creamer | |
| 8,140,978 B2 | 3/2012 | Betzler | |
| 8,140,982 B2 | 3/2012 | Hamilton, II | |
| 8,145,676 B2 | 3/2012 | Bhogal | |
| 8,145,725 B2 | 3/2012 | Dawson | |
| 8,149,241 B2 | 4/2012 | Do | |
| 8,151,191 B2 | 4/2012 | Nicol, II | |
| 8,156,184 B2 | 4/2012 | Kurata | |
| 8,165,350 B2 | 4/2012 | Fuhrmann | |
| 8,171,407 B2 | 5/2012 | Huang | |
| 8,171,408 B2 | 5/2012 | Dawson | |
| 8,171,559 B2 | 5/2012 | Hamilton, II | |
| 8,174,541 B2 | 5/2012 | Greene | |
| 8,176,421 B2 | 5/2012 | Dawson | |
| 8,176,422 B2 | 5/2012 | Bergman | |
| 8,184,092 B2 | 5/2012 | Cox | |
| 8,184,116 B2 | 5/2012 | Finn | |
| 8,185,450 B2 | 5/2012 | McVey | |
| 8,185,829 B2 | 5/2012 | Cannon | |
| 8,187,067 B2 | 5/2012 | Hamilton, II | |
| 8,199,145 B2 | 6/2012 | Hamilton, II | |
| 8,203,561 B2 | 6/2012 | Carter | |
| 8,214,335 B2 | 7/2012 | Hamilton, II | |
| 8,214,433 B2 | 7/2012 | Dawson | |
| 8,214,750 B2 | 7/2012 | Hamilton, II | |
| 8,214,751 B2 | 7/2012 | Dawson | |
| 8,217,953 B2 | 7/2012 | Comparan | |
| 8,219,616 B2 | 7/2012 | Dawson | |
| 8,230,045 B2 | 7/2012 | Kawachiya | |
| 8,230,338 B2 | 7/2012 | Dugan | |
| 8,233,005 B2 | 7/2012 | Finn | |
| 8,234,234 B2 | 7/2012 | Shearer | |
| 8,234,579 B2 | 7/2012 | Do | |
| 8,239,775 B2 | 8/2012 | Beverland | |
| 8,241,131 B2 | 8/2012 | Bhogal | |
| 8,245,241 B2 | 8/2012 | Hamilton, II | |
| 8,245,283 B2 | 8/2012 | Dawson | |
| 8,265,253 B2 | 9/2012 | D Amora | |
| 8,310,497 B2 | 11/2012 | Comparan | |
| 8,334,871 B2 | 12/2012 | Hamilton, II | |
| 8,360,886 B2 | 1/2013 | Karstens | |
| 8,364,804 B2 | 1/2013 | Childress | |
| 8,425,326 B2 | 4/2013 | Chudley | |
| 8,442,946 B2 | 5/2013 | Hamilton, II | |
| 8,506,372 B2 | 8/2013 | Chudley | |
| 8,514,249 B2 | 8/2013 | Hamilton, II | |
| 8,554,841 B2 | 10/2013 | Kurata | |
| 8,607,142 B2 | 12/2013 | Bergman | |
| 8,607,356 B2 | 12/2013 | Hamilton, II | |
| 8,624,903 B2 | 1/2014 | Hamilton, II | |
| 8,626,836 B2 | 1/2014 | Dawson | |
| 8,692,835 B2 | 4/2014 | Hamilton, II | |
| 8,696,465 B2 * | 4/2014 | Gatto | G07F 17/32 463/25 |
| 8,721,412 B2 | 5/2014 | Chudley | |
| 8,827,816 B2 | 9/2014 | Bhogal | |
| 8,838,640 B2 | 9/2014 | Bates | |
| 8,849,917 B2 | 9/2014 | Dawson | |
| 8,911,296 B2 | 12/2014 | Chudley | |
| 8,992,316 B2 | 3/2015 | Smith | |
| 9,083,654 B2 | 7/2015 | Dawson | |
| 9,152,914 B2 | 10/2015 | Haggar | |
| 9,205,328 B2 | 12/2015 | Bansi | |
| 9,286,731 B2 | 3/2016 | Hamilton, II | |
| 9,299,080 B2 | 3/2016 | Dawson | |
| 9,364,746 B2 | 6/2016 | Chudley | |
| 9,525,746 B2 | 12/2016 | Bates | |
| 9,583,109 B2 | 2/2017 | Kurata | |
| 9,682,324 B2 | 6/2017 | Bansi | |
| 9,764,244 B2 | 9/2017 | Bansi | |
| 9,789,406 B2 | 10/2017 | Marr | |
| 9,795,887 B2 * | 10/2017 | Lin | A63F 13/795 |
| 9,808,722 B2 | 11/2017 | Kawachiya | |
| 9,827,488 B2 * | 11/2017 | Pearce | G07F 17/32 |
| 2001/0032240 A1 | 10/2001 | Malone | |
| 2002/0002514 A1 | 1/2002 | Kamachi | |
| 2002/0007319 A1 | 1/2002 | Yu | |
| 2002/0026388 A1 | 2/2002 | Roebuck | |
| 2002/0035480 A1 | 3/2002 | Gordon | |
| 2002/0035593 A1 | 3/2002 | Salim | |
| 2002/0043568 A1 | 4/2002 | Hess | |
| 2002/0065870 A1 | 5/2002 | Baehr-Jones | |
| 2002/0095586 A1 | 7/2002 | Doyle | |

(56) References Cited

U.S. PATENT DOCUMENTS

| | | |
|---|---|---|
| 2002/0096831 A1 | 7/2002 | Nakayama |
| 2002/0097856 A1 | 7/2002 | Wullert |
| 2002/0116466 A1 | 8/2002 | Trevithick |
| 2002/0124137 A1 | 9/2002 | Ulrich |
| 2002/0130904 A1 | 9/2002 | Becker |
| 2002/0135618 A1 | 9/2002 | Maes |
| 2002/0169665 A1 | 11/2002 | Hughes |
| 2002/0184373 A1 | 12/2002 | Maes |
| 2002/0184391 A1 | 12/2002 | Phillips |
| 2002/0188688 A1 | 12/2002 | Bice |
| 2003/0008712 A1 | 1/2003 | Poulin |
| 2003/0014297 A1 | 1/2003 | Kaufman |
| 2003/0032476 A1 | 2/2003 | Walker |
| 2003/0050977 A1 | 3/2003 | Puthenkulam |
| 2003/0055892 A1 | 3/2003 | Huitema |
| 2003/0056002 A1 | 3/2003 | Trethewey |
| 2003/0076353 A1 | 4/2003 | Blackstock |
| 2003/0101343 A1 | 5/2003 | Eaton |
| 2003/0112952 A1 | 6/2003 | Brown |
| 2003/0135621 A1 | 7/2003 | Romagnoli |
| 2003/0141977 A1 | 7/2003 | Brown |
| 2003/0145128 A1 | 7/2003 | Baird |
| 2003/0149675 A1 | 8/2003 | Ansari |
| 2003/0177187 A1 | 9/2003 | Levine |
| 2003/0195957 A1 | 10/2003 | Banginwar |
| 2003/0210265 A1 | 11/2003 | Haimberg |
| 2004/0014514 A1 | 1/2004 | Yacenda |
| 2004/0054667 A1 | 3/2004 | Kake |
| 2004/0059781 A1 | 3/2004 | Yoakum |
| 2004/0078432 A1 | 4/2004 | Manber |
| 2004/0078596 A1 | 4/2004 | Kent |
| 2004/0088303 A1 | 5/2004 | Elder |
| 2004/0097287 A1 | 5/2004 | Postrel |
| 2004/0103079 A1 | 5/2004 | Tokusho |
| 2004/0113756 A1 | 6/2004 | Mollenkopf |
| 2004/0127277 A1 | 7/2004 | Walker |
| 2004/0128181 A1 | 7/2004 | Zurko |
| 2004/0172339 A1 | 9/2004 | Snelgrove |
| 2004/0174392 A1 | 9/2004 | Bjoernsen |
| 2004/0186886 A1 | 9/2004 | Galli et al. |
| 2004/0205134 A1 | 10/2004 | Digate |
| 2004/0210627 A1 | 10/2004 | Kroening |
| 2004/0228291 A1 | 11/2004 | Huslak |
| 2004/0244006 A1 | 12/2004 | Kaufman |
| 2004/0260771 A1 | 12/2004 | Gusler et al. |
| 2005/0015571 A1 | 1/2005 | Kaufman |
| 2005/0021484 A1 | 1/2005 | Bodin |
| 2005/0027696 A1 | 2/2005 | Swaminathan |
| 2005/0050137 A1 | 3/2005 | Bodin |
| 2005/0060368 A1 | 3/2005 | Wang |
| 2005/0071428 A1 | 3/2005 | Khakoo |
| 2005/0071462 A1 | 3/2005 | Bodin |
| 2005/0080859 A1 | 4/2005 | Lake |
| 2005/0091380 A1 | 4/2005 | Gonen |
| 2005/0097440 A1 | 5/2005 | Lusk |
| 2005/0132009 A1 | 6/2005 | Solie |
| 2005/0138108 A1 | 6/2005 | Galvin |
| 2005/0149620 A1 | 7/2005 | Kirkland |
| 2005/0165893 A1 | 7/2005 | Feinberg |
| 2005/0216346 A1 | 9/2005 | Kusumoto |
| 2005/0223075 A1 | 10/2005 | Swearingen et al. |
| 2005/0246711 A1 | 11/2005 | Berstis |
| 2005/0277472 A1 | 12/2005 | Gillan |
| 2006/0003305 A1 | 1/2006 | Kelmar |
| 2006/0004659 A1 | 1/2006 | Hutchison |
| 2006/0026253 A1 | 2/2006 | Kessen |
| 2006/0031322 A1 | 2/2006 | Kessen |
| 2006/0031326 A1 | 2/2006 | Ovenden |
| 2006/0036688 A1 | 2/2006 | McMahan |
| 2006/0121990 A1 | 6/2006 | O'Kelley |
| 2006/0128460 A1 | 6/2006 | Muir |
| 2006/0129643 A1 | 6/2006 | Nielson |
| 2006/0155813 A1 | 7/2006 | Dietz et al. |
| 2006/0161852 A1 | 7/2006 | Chen |
| 2006/0178968 A1 | 8/2006 | Jung |
| 2006/0184260 A1 | 8/2006 | Graepel et al. .............. 700/92 |
| 2006/0190591 A1 | 8/2006 | Bobde |
| 2006/0252526 A1 | 11/2006 | Walker |
| 2006/0258463 A1* | 11/2006 | Cugno .................. A63F 13/12 463/42 |
| 2007/0026934 A1 | 2/2007 | Herbrich et al. .............. 463/23 |
| 2007/0066403 A1 | 3/2007 | Conkwright |
| 2007/0073582 A1 | 3/2007 | Jung |
| 2007/0106526 A1 | 5/2007 | Jung |
| 2007/0111789 A1 | 5/2007 | van Deursen |
| 2007/0112624 A1 | 5/2007 | Jung |
| 2007/0112706 A1 | 5/2007 | Herbrich et al. .............. 706/21 |
| 2007/0117623 A1 | 5/2007 | Nelson |
| 2007/0130001 A1 | 6/2007 | Jung |
| 2007/0168444 A1 | 7/2007 | Chen |
| 2007/0168447 A1 | 7/2007 | Chen |
| 2007/0180040 A1 | 8/2007 | Etgen |
| 2007/0265718 A1 | 11/2007 | Graepel et al. .............. 700/91 |
| 2007/0298867 A1 | 12/2007 | Huang |
| 2008/0019353 A1 | 1/2008 | Foote |
| 2008/0059304 A1 | 3/2008 | Kimsey |
| 2008/0064467 A1 | 3/2008 | Reiner |
| 2008/0113815 A1 | 5/2008 | Weingardt |
| 2008/0126350 A1 | 5/2008 | Shoemaker |
| 2008/0155019 A1 | 6/2008 | Wallace |
| 2008/0176655 A1 | 7/2008 | James |
| 2008/0207329 A1 | 8/2008 | Wallace |
| 2008/0214287 A1 | 9/2008 | Lutnick |
| 2008/0242420 A1 | 10/2008 | Graepel |
| 2008/0254893 A1 | 10/2008 | Patel |
| 2008/0270605 A1 | 10/2008 | Berstis |
| 2008/0270916 A1 | 10/2008 | Chen |
| 2008/0301405 A1 | 12/2008 | Kaufman |
| 2009/0005172 A1 | 1/2009 | Shibahara |
| 2009/0075738 A1 | 3/2009 | Pearce |
| 2009/0113448 A1 | 4/2009 | Smith |
| 2009/0137320 A1 | 5/2009 | Kimura |
| 2009/0253494 A1 | 10/2009 | Fitch |
| 2009/0325711 A1 | 12/2009 | Bronstein |
| 2010/0306672 A1 | 12/2010 | McEniry |
| 2011/0190063 A1 | 8/2011 | Kajii |
| 2012/0021825 A1 | 1/2012 | Harp |
| 2013/0296046 A1 | 11/2013 | Mianji |
| 2014/0004955 A1 | 1/2014 | Nahari |
| 2014/0004960 A1* | 1/2014 | Soti .................. A63F 13/795 463/42 |
| 2014/0011595 A1 | 1/2014 | Muller |
| 2014/0162763 A1 | 6/2014 | Kim |
| 2014/0162781 A1 | 6/2014 | Butler |
| 2014/0274402 A1* | 9/2014 | Michel .................. A63F 13/12 463/42 |
| 2014/0344725 A1 | 11/2014 | Bates |
| 2014/0349753 A1 | 11/2014 | Imai |
| 2015/0038233 A1 | 2/2015 | Rom |
| 2015/0310698 A1 | 10/2015 | Polis |
| 2016/0001181 A1 | 1/2016 | Marr |
| 2016/0001182 A1 | 1/2016 | Marr |
| 2016/0001186 A1 | 1/2016 | Marr |
| 2016/0005270 A1 | 1/2016 | Marr |
| 2016/0191671 A1 | 6/2016 | Dawson |
| 2016/0296840 A1 | 10/2016 | Kaewell |

FOREIGN PATENT DOCUMENTS

| | | |
|---|---|---|
| CA | 2143874 | 6/2000 |
| CA | 2292678 | 7/2005 |
| CA | 2552135 | 7/2013 |
| CN | 1334650 A | 2/2002 |
| CN | 1202652 C | 10/2002 |
| CN | 1141641 C | 3/2004 |
| CN | 1494679 A | 5/2004 |
| CN | 1219384 | 9/2005 |
| CN | 1307544 | 3/2007 |
| CN | 100407675 | 7/2008 |
| CN | 100423016 C | 10/2008 |
| CN | 100557637 | 11/2009 |
| CN | 101001678 B | 5/2010 |
| CN | 101436242 | 12/2010 |
| CN | 101801482 B | 12/2014 |

(56) References Cited

FOREIGN PATENT DOCUMENTS

| | | |
|---|---|---|
| EP | 668583 | 8/1995 |
| EP | 0627728 B1 | 9/2000 |
| EP | 0717337 B1 | 8/2001 |
| EP | 1207694 A2 | 5/2002 |
| EP | 1209849 A2 | 5/2002 |
| EP | 0679977 B1 | 10/2002 |
| EP | 0679978 B1 | 3/2003 |
| EP | 0890924 B1 | 9/2003 |
| EP | 1377902 B1 | 8/2004 |
| EP | 0813132 B1 | 1/2005 |
| EP | 1380133 B1 | 3/2005 |
| EP | 1021021 B1 | 9/2005 |
| EP | 0930584 B1 | 10/2005 |
| EP | 0883087 B1 | 8/2007 |
| EP | 1176828 B1 | 10/2007 |
| EP | 2076888 B1 | 7/2015 |
| GB | 2339938 | 10/2002 |
| GB | 2352154 | 7/2003 |
| JP | H11191097 A | 4/1999 |
| JP | 11191097 | 7/1999 |
| JP | 3033956 B2 | 4/2000 |
| JP | 3124916 B2 | 1/2001 |
| JP | 2001119403 A | 4/2001 |
| JP | 3177221 B2 | 6/2001 |
| JP | 2001204973 A | 7/2001 |
| JP | 3199231 B2 | 8/2001 |
| JP | 2001230883 A | 8/2001 |
| JP | 3210558 B2 | 9/2001 |
| JP | 3275935 | 2/2002 |
| JP | 3361745 | 1/2003 |
| JP | 3368188 B2 | 1/2003 |
| JP | 3470955 B | 9/2003 |
| JP | 3503774 | 12/2003 |
| JP | 2004062539 A | 2/2004 |
| JP | 3575598 | 7/2004 |
| JP | 3579823 B | 7/2004 |
| JP | 3579154 B2 | 10/2004 |
| JP | 3701773 B2 | 10/2005 |
| JP | 3777161 | 3/2006 |
| JP | 3914430 B | 2/2007 |
| JP | 3942090 B | 4/2007 |
| JP | 3962361 | 5/2007 |
| JP | 4009235 B | 9/2007 |
| JP | 4225376 | 12/2008 |
| JP | 4653075 | 12/2010 |
| JP | 5063698 B | 8/2012 |
| JP | 5159375 B2 | 3/2013 |
| JP | 535220062 | 11/2013 |
| JP | 5550720 B2 | 7/2014 |
| JP | 2015002839 A | 1/2015 |
| JP | 5734566 B2 | 6/2015 |
| KR | 20020038229 A | 5/2002 |
| KR | 20030039019 A | 5/2003 |
| MY | 117864 A | 8/2004 |
| SG | 55396 | 12/1998 |
| TW | 424213 | 3/2001 |
| TW | 527825 | 4/2003 |
| TW | 200836091 | 9/2008 |
| TW | 200937926 | 9/2009 |
| TW | 201002013 | 1/2010 |
| TW | 201009746 | 3/2010 |
| TW | 201024997 | 7/2010 |
| TW | 201028871 | 8/2010 |
| WO | 0060444 A1 | 10/2000 |
| WO | 0062231 A1 | 10/2000 |
| WO | 0137162 A2 | 5/2001 |
| WO | 0201455 A2 | 1/2002 |
| WO | 0203645 A2 | 1/2002 |
| WO | 2002073457 | 9/2002 |
| WO | 20020087156 | 10/2002 |
| WO | 03044755 A1 | 5/2003 |
| WO | 03049459 A1 | 6/2003 |
| WO | 03058518 A2 | 7/2003 |
| WO | 2004086212 | 10/2004 |
| WO | 2005079538 | 9/2005 |
| WO | 2007101785 | 9/2007 |
| WO | 2008037599 | 4/2008 |
| WO | 2008074627 | 6/2008 |
| WO | 2008095767 | 8/2008 |
| WO | 2009037257 | 3/2009 |
| WO | 2009104564 | 8/2009 |
| WO | 2010096738 A1 | 8/2010 |

OTHER PUBLICATIONS

Office Action dated Feb. 13, 2017 for U.S. Appl. No. 14/712,541.
Office Action dated Jan. 20, 2017 for U.S. Appl. No. 14/712,566.
Notice of Allowance dated Jun. 14, 2017 for U.S. Appl. No. 14/712,566.
Office Action dated Oct. 19, 2017 for U.S. Appl. No. 14/712,514; (pp. 1-12).
Office Action dated Aug. 7, 2017 for U.S. Appl. No. 14/712,541; (pp. 1-16).
Office Action dated Mar. 14, 2018 for U.S. Appl. No. 14/712,541 (pp. 1-16).
Office Action dated Mar. 14, 2018 for U.S. Appl. No. 15/703,757.
Duong et al; "A dynamic load sharing algorithm for massivly multiplayer online games" published Sep. 28, 2003-Oct. 1, 2003. http://ieeexplore.ieee.org/iel5/8945/28322/01266179.pdf?tp=&arnumber-=1266179&isnumber=28322http://ieeexplore.ieee.org/xpl/absprintf.jsp?arnumb- er=1266179.
"A multi-server architecture for distributed virtual walkthrough" http://delivery.acm.org/10.1145/590000/585768/p163-ng.pdf?key1=585768&key-2=0554824911&coll=GUIDE&dl=GUIDE&CFID=41712537&CFTOKEN=50783297.
Mauve, M., Fischer, S., and Widmer, J. 2002. A generic proxy system for networked computer games. In Proceedings of the 1st Workshop on Network and System Support for Games (Braunschweig, Germany, Apr. 16-17, 2002). NetGames '02. ACM, New York, NY, 25-28. DOI= http://doi.acm.org/10.1145/566500.566504.
IBM developer Works, OptimalGrid—autonomic computing on the Grid, James H. Kaufman; Tobin J. Lehman; Glenn Deen; and John Thomas, Jun. 2003.
IBM, Transcoding: Extending e-business to new environments, Britton et al., Sep. 22, 2000.
Lee et al., "A Self-Adjusting Data Distribution Mechanism for Multidimensional Load Balancing in Multiprocessor-Based Database Systems," Information Systems vol. 19, No. 7, pp. 549-567, 1994.
Ma et al., "A Scalable Parallel Cell-Projection Volume Rendering Algorithm for Three-Dimensional Unstructured Data", IEEE 1997, pp. 1-10.
Feng et al., "A Parallel Hierarchical Radiosity Algorithm for Complex Scenes," Proceedings IEEE Symposium on Parallel Rendering (PRS) '97), IEEE Computer Society Technical Committee on Computer Graphics in cooperation with ACM SIGGRAPH pp. 71-79, 1997.
Hassen et al., "A Task-and Data-Parallel Programming Language Based on Shared Objects," ACM Transactions on Programming Languages and Systems, vol. 20, No. 6, Nov. 1998, pp. 1131-1170.
Andert, "A Simulation of Dynamic Task Allocation in a Distributed Computer System," Proceedings of the 1987 Winter Simulation Conference, 1987, pp. 1-9.
Supplementary European Search from the European Patent Office for EP05723458.5, dated Jul. 19, 2010.
International Search Report as Published as WO2005/079538 in corresponding international application No. PCT/US2005/005550, dated Jul. 5, 2006.
K. Loesing et al., "Privacy-aware presence management in instant messaging systems", Distributed & Mobile Syst. Group, Otto-Friedrich-Univ. Germany, Proceedings. 20th International Parallel and Distributed Processing Symposium Rhodes Island, Greece; (IEEE Cat. No. 06TH8860), 2006, 8 pp.
Y. Zhao et al., "A 3D virtual shopping mall that has the intelligent virtual purchasing guider and cooperative purchasing functionalities", CSCWD 2004—8th International Conference on Computer Supported Cooperative Work in Design—Proceedings, 2004, p. 381-385.

(56) References Cited

OTHER PUBLICATIONS

V. Stojanovic, "Virtual boutique-try clothes on-line", 5th International Conference on Telecommunications in Modern Satellite, Cable and Broadcasting Service. TELSIKS 2001. Proceedings of Papers (Cat. No. 01EX517), 2001, pt. 2, p. 802-3 vol. 2.

Roaming Virtual World Is a Real Trip; [Final Edition] Leslie Walker. The Washington Post. Washington, D.C.: Mar. 30, 2006.

E-Entrepreneurship: Learning in a Simulated Environment Salim Jiwa, Dawn Lavelle, Arjun Rose. Journal of Electronic Commerce in Organizations. Hershey: Jul.-Sep. 2005. vol. 3, Iss. 3.

Kautz, H., B. Selman, M. Shah.. "Referral Web: Combining Social Networks and Collaborative Filtering". Communications of the ACM, vol. 40, No. 3, Mar. 1997.

Schwartz, M. F., D. C. M. Wood. "Discovering shared interests among people using graph analysis of global electronic mail traffic". Department of Computer Science, University of Colorado, Boulder CO. Oct. 1992.

Wellman, B. "For a social network analysis of computer networks: a sociological perspective on collaborative work and virtual community". Proceedings of the 1996 conference on ACM SIGCPR/SIGMIS. 1-11.

Qureshi, S. "Supporting electronic group processes: a social perspective". Proceedings of the 1995 ACM SIGCPR Conference on Supporting teams, groups, and learning inside the IS function. ACM Press. 24-34.

Ackerman, M.S., B. Starr. "Social activity indicators: interface components for CSCW systems". Proceedings of the 8th ACM Symposium on User Interface and Software Technology. ACM Press. 159-168, Nov. 14-17, 1995.

Garton, L., C. Haythornthwaite, B. Wellman. "Studying on-line social networks in Doing Internet Research", Jun. 1997.

Srivastava, Jaidepp, Robert Cooley, Mukund Deshpande, Pang-Ning Tan. "Web Usage Mining: Discovery and Applications of Usage Patterns from Web Data". SIGKDD Explorations, vol. 1, Issue 2. Jan. 2000. 12-23.

Wang, Y. "Web Mining and Knowledge Discovery of Usage Patterns". CS748T Project (Part I) Feb. 2000.

Sack, W. "Conversation Map: a content-based Usenet newsgroup browser". Proceedings of the 2000 International Conference on Intelligent User Interfaces. ACM Press. 233-240.

Feldman, R. "Mining unstructured data". Tutorial notes for ACK SIGKDD 1999. ACM Press. 182-236.

"Universally Unique Identifier", 2006 (http://en.wikipedia.org/wiki/UUID).

Office Action dated May 24, 2018 for U.S. Appl. No. 14/712,359 (pp. 1-20).

* cited by examiner

GROUP COMPOSITION MATCHMAKING SYSTEM AND METHOD FOR MULTIPLAYER VIDEO GAMES

RELATED APPLICATIONS

This application claims priority to U.S. Provisional Patent Application Ser. No. 62/020,732, filed on Jul. 3, 2014; U.S. Provisional Patent Application Ser. No. 62/020,739, filed on Jul. 3, 2014; U.S. Provisional Patent Application Ser. No. 62/020,743, filed on Jul. 3, 2014; and U.S. Provisional Patent Application Ser. No. 62/020,750, filed on Jul. 3, 2014, the entireties of which are hereby incorporated by reference herein in their entireties. This application is related to concurrently filed U.S. patent application Ser. No. 14/712,514, entitled "MATCHMAKING SYSTEM AND METHOD FOR MULTIPLAYER VIDEO GAMES"; U.S. patent application Ser. No. 14/712,541, entitled "SOFT RESERVATION SYSTEM AND METHOD FOR MULTIPLAYER VIDEO GAMES" and issued as U.S. Pat. No. 10,286,326 on May 14, 2019; and U.S. patent application Ser. No. 14/712,566, entitled "SYSTEM AND METHOD FOR DRIVING MICROTRANSACTIONS IN MULTIPLAYER VIDEO GAMES" and issued as U.S. Pat. No. 9,789,406 on Oct. 17, 2017, all of which are hereby incorporated by reference herein in their entireties.

FIELD OF THE INVENTION

The invention relates to a group composition system and method for multiplayer video games.

BACKGROUND OF THE INVENTION

Multiplayer video games have exploded in popularity due, in part, to services such as Microsoft's Xbox LIVE® and Sony's PlayStation Network® which enable garners all over the world to play with or against one another. Generally, a multiplayer video game is a video game in which two or more players play in a gameplay session in a cooperative or adversarial relationship. At least one of the players may comprise a human player, while one or more other players may comprise either non-player characters and/or other human players.

Typically, when a player logs in to a game system or platform to play a multiplayer video game, the player may engage in a gameplay session in which he or she is matched with other players to play together (on the same team or as opponents). A given player may engage in multiple gameplay sessions during a login session. In addition, each gameplay session may be played with either the same or a different group of matched players.

Conventionally, when interested in playing in a group with other players, an individual player may ask friends to form a player group, may ask other players who are of the same skill level to form a player group, and/or may otherwise form a group by sending invitations to other players.

Some systems may automatically group or match players based solely on a limited number of hard-coded characteristics (e.g., skill level), which are not dynamically adjusted. Such systems may create a hard set of segregated pools of players. For example, in some conventional systems, a player who is at a certain skill level may never be matched with a player at a higher skill level, which may result in one dimensional and unsatisfying gameplay.

Furthermore, conventional systems fail to assess a quality of gameplay used to tune matchmaking processes to optimize player combinations. Conventional systems also fail to reserve gameplay sessions for players in a way that minimizes the time that a player must wait to be matched. Conventional systems further fail to leverage matchmaking processes in other contexts, such as influencing game-related purchases, suggesting group formations, training/identifying non-player characters, and/or otherwise extending the use of the matchmaking process. These and other drawbacks exist with current matchmaking processes utilized in multiplayer video games.

SUMMARY OF THE INVENTION

The invention addressing these and other drawbacks relates to a matchmaking system and method that facilitates optimization of player matches for multiplayer video games. The system may provide a generalized framework for matchmaking using historical player data and analytics. The framework may facilitate automatic determinations of an optimal mix of players and styles to produce more satisfying player experiences. Additionally, the system may dynamically update analytical processes based on statistical or otherwise observed data related to gameplay at a given time. In this manner, the system may continually tune the matchmaking process based on observations of player behavior, gameplay quality, and/or other information.

While aspects of the invention may be described herein with reference to various game levels or modes, characters, roles, game items, etc. associated with a First-Person-Shooter (FPS) game, it should be appreciated that any such examples are for illustrative purposes only, and are not intended to be limiting. The matchmaking system and method described in detail herein may be used in any genre of multiplayer video game, without limitation In one implementation of the invention, the system may include a scoring engine that identifies a potential match. As used herein, the term "match" refers to a matching of two or more players, rather than a contest. For example, a potential match refers to a potential grouping of two or more players. The scoring engine may obtain one or more match variables used to generate a match score for the potential match. The one or more match variables may include, without limitation, a latency between players, a relative skill level, a presence of preferred players (e.g., clan mates or friends), a team composition, a time that a given player has been waiting to be matched (e.g., in a game lobby), a player preference, and/or other information used to assess a potential match.

A given match variable may be assigned a coefficient that indicates a level of importance, or weight, of the given match variable. The scoring engine may generate a match score based on the match variables and their corresponding coefficients. In this manner, the scoring engine may consider multiple variables, each of which may be assigned with varying degrees of importance, when assessing the suitability of a potential match.

A game designer or others may assign a default value to a given coefficient based on the game designer's opinion of the relative importance of a corresponding match variable. The default value of a coefficient may be used unless it is changed.

A coefficient may be tuned by changing its default value. Coefficients may be tuned in various ways, and by various parties, to respond to preferences, changing game conditions, and/or other information. In this manner, the scoring engine may determine match scores based on dynamically changing information, and adjust the matchmaking process accordingly.

For example, a player may tune coefficients by indicating gameplay preferences, such as through a user interface associated with a game. For example, a player may prioritize being matched with friends even over shorter wait times to join a match. The system may respond to such a preference by tuning a coefficient related to playing with preferred players (e.g., friends, clan members, etc.) such that playing with preferred players has more importance when generating a match score. Alternatively or additionally, the system may tune a coefficient related to wait times such that wait times has less importance when generating a match score.

In some implementations, the scoring engine may automatically tune the coefficients based on changing circumstances, game history, and/or other analytical data. For example, if a player has been waiting in a game lobby for more than a predetermined length of time, the scoring engine may place more weight on getting the player into a match sooner (e.g., tune a coefficient related to wait times).

In another example, if a player has been performing poorly (e.g., getting killed at a rate higher than the player's historical rate), the scoring engine may dynamically adjust one or more coefficients to match the player in a game that will improve the player's performance. For example, the player may be matched with easier opponents, matched with better teammates, and/or placed in a game that is more tailored to the player's preferences (e.g., players that play in games more closely aligned with their preferences tend to perform better).

To fine-tune the matchmaking process, the system may include an analytics and feedback engine that analyzes player and match data to determine whether a given match was good. A match may be deemed "good" when a player is determined to have enjoyed gameplay associated with the match based on one or more quality factors that are used as a proxy for player satisfaction. The quality factors may include, for example, a duration of a gameplay session (e.g., via analysis of player historical data), player psychological state (e.g., frustration level), and/or other information.

In one implementation, the analytics and feedback engine may analyze game data (e.g., whether a given game level or match favors play styles), historical player data (e.g., types/styles of player, strengths/weaknesses of players, etc.), and/or other information to assess a quality of player experiences.

The analytics and feedback engine may analyze game data to determine satisfying types of gameplay that should be provided through the matchmaking process. For example, the analytics and feedback engine may determine whether given combinations of role types (e.g., sniper, run-and-gunners, etc.) lead to satisfying gameplay. Such analysis may be performed for specific portions of a game (e.g., a game level) and/or generally for a game.

The analytics and feedback engine may analyze player data to determine the player style/role that is most effective for the player based on historical information associated with the player. For example, the analytics and feedback engine may determine that a player is most effective or otherwise most enjoys playing as a sniper, which may cause matchmaking to skew towards matches where the player may play in a sniper role.

The analytics and feedback engine may analyze game and player combinations to infer what makes a good match for specific players and specific games, and/or which kinds of players/play styles might be favored by a particular match.

In this manner, the analytics and feedback engine may use various data and metrics to assess whether a gameplay session was a good one, and/or whether a future gameplay session will similarly be good for a given player.

According to an aspect of the invention, the system may include a pipelining engine that may generate one or more "soft reservations" for a player based on a match score, a game profile, a player profile, and/or other information. A soft reservation may comprise a match between two or more players for one or more subsequent gameplay sessions that are reserved for the players. The match may be generated as described herein (e.g., based on match scores exceeding a threshold match score).

The pipelining engine may, for instance, anticipate an interest by players in a subsequent gameplay session (e.g., based on a game profile and/or a player profile) and make a soft reservation for two or more players. For example, a soft reservation may be generated before the players have expressed an interest in the subsequent gameplay sessions.

For example, and without limitation, the pipelining engine may analyze a game progression of a player (e.g., which may be stored in a player profile) and predict a game mode (e.g., capture the flag) that will likely interest the player. The pipelining engine may then make a soft reservation for the player for a gameplay session that includes the game mode.

In another example, the pipelining engine may determine whether preferred players (e.g., clan members or friends) of a given player have logged on. Upon obtaining information that indicates that a player's clan members or friends have logged on, and that the player prefers to play with clan members or friends, the pipelining engine may make a soft reservation for the player to play in a subsequent gameplay session with his or her clan members or friends.

Once a soft reservation has been made, a player may be invited to join an associated gameplay session. The player may accept the invitation, in which case the player may start playing in the gameplay session. On the other hand, if the player rejects the invitation, then other players may be invited to join the gameplay session to replace the player. Such acceptances and rejections may be added to a player profile so that future soft reservations may be fine-tuned based on acceptances (which may indicate a relevant soft reservation was made) and rejections (which may indicate a non-relevant soft reservation was made).

Because a player may reject an invitation to join a gameplay session associated with a soft reservation, the pipelining engine may make soft reservations for a number of players that exceeds a maximum number allowed by a given gameplay session. For example, if a maximum number players in a clan for a gameplay session is ten, the pipelining engine may make a soft reservation for a greater number (e.g., fifteen) of players for the gameplay session. In this manner, the pipelining engine may expect a certain number of rejections to be made (e.g., five in the foregoing example), and may therefore "overbook" the number of soft reservations (hereinafter, "overbook number"). An overbook number may be predefined or automatically determined based on a game profile, a player profile, and/or other information. For example, certain game modes, games, players, etc., may be associated with a propensity to accept soft reservations than others. The pipelining engine may monitor such tendencies over time to dynamically adjust the overbook number for a game mode, a game, a player, etc.

In one implementation, a player for which a soft reservation has been made for a gameplay session may be added to the gameplay session "in progress" (after it has started).

For example, a player who has a soft reservation for a particular gameplay session may join the particular gameplay session after the player's current gameplay session is over. In this manner, the particular gameplay session may be reserved for the player even after the gameplay session has started.

A player waiting to be matched into a future gameplay session may be required to wait for the future gameplay session to start. For example, a first player who prefers to play with friends may prefer to wait to be matched with friends, instead of being placed into a gameplay session with only strangers. If the two friends of the first player are currently playing in a gameplay session, which has not yet completed, the pipelining engine may make a soft reservation for the three players to play together in a future gameplay session.

In the meantime, the first player can continue to wait until the two friends are available or may join a gameplay session that the pipelining engine determines will likely finish at approximately the same time that the two friends' gameplay session is expected to finish. For example, the pipelining engine may determine that the two friends will complete their gameplay session in ten minutes and may match the first player into a gameplay session that is expected to be complete in ten minutes. In this manner, all three friends may be expected to become available at approximately the same time.

The matchmaking system and method may be leveraged in various contexts as well, such as to influence game-related purchases, recommend a composition of groups of players, train or identify non-player characters (NPCs) that should be used, and/or other contexts.

For example, in one implementation, the system may include a microtransaction engine that arranges matches to influence game-related purchases. For instance, the microtransaction engine may match a more expert/marquee player with a junior player to encourage the junior player to make game-related purchases of items possessed/used by the marquee player. A junior player may wish to emulate the marquee player by obtaining weapons or other items used by the marquee player.

The microtransaction engine may analyze various items used by marquee players and, if the items are being promoted for sale, match the marquee player with another player (e.g., a junior player) that does not use or own the items. Similarly, the microtransaction engine may identify items to be promoted, identify marquee players that use those items, and match the marquee players with other players who do not use those items. In this manner, the microtransaction engine may leverage the matchmaking abilities described herein to influence purchase decisions for game-related purchases.

In one implementation, the microtransaction engine may target particular players to make game-related purchases based on their interests. For example, the microtransaction engine may identify a junior player to match with a marquee player based on a player profile of the junior player. In a particular example, the junior player may wish to become an expert sniper in a game (e.g., as determined from the player profile). The microtransaction engine may match the junior player with a player that is a highly skilled sniper in the game. In this manner, the junior player may be encouraged to make game-related purchases such as a rifle or other item used by the marquee player.

In one implementation, when a player makes a game-related purchase, the microtransaction engine may encourage future purchases by matching the player (e.g., using matchmaking described herein) in a gameplay session that will utilize the game-related purchase. Doing so may enhance a level of enjoyment by the player for the game-related purchase, which may encourage future purchases. For example, if the player purchased a particular weapon, the microtransaction engine may match the player in a gameplay session in which the particular weapon is highly effective, giving the player an impression that the particular weapon was a good purchase. This may encourage the player to make future purchases to achieve similar gameplay results.

In one implementation, the system may suggest a composition of a group of players using the matchmaking process. For example, one or more players may wish to form or join a group of players for a given game, but not know what would be an appropriate mix of player styles, player roles, skill levels, and/or other player characteristics that would make an optimal group, given the player's own characteristics.

The system may identify optimal groups based on matchmaking related information such as, without limitation, game profile, player profile (e.g., explicit preferences, purchases made, player styles, etc.), prior match scores, prior quality scores, and/or other information. Optimal groups may be those that have performed successfully (e.g., accomplished the most wins, objectives, etc.), are associated with the highest player enjoyment (e.g., based on match and/or quality scores), and/or otherwise are deemed to be desirable.

According to one aspect of the invention, the matchmaking may be used to manage NPCs. For example, the system may be used to select/generate a NPC to fill a gap in a clan or team, generate a team or clan of NPCs, analyze NPCs post-game session to identify successful NPCs, and/or perform other actions with respect to NPCs.

The system may identify a gap in a number of players required for a given gameplay session such as, for example, when only nine (or less) human players have joined in a game that requires ten players in a clan. In this case, the system may assign one or more NPCs to play along with the human players in the clan. The system may generate potential matches between the human players who have joined and potential NPCs to fill the gaps. The system may score each potential match and select NPCs that are associated with the highest match scores. For example, in a game in which the system has determined that five snipers and five run-and-gunners represent an optimal mix of player roles, the system may select NPCs to fill gaps such that the desired combination of five snipers and five run-and-gunners is achieved to the extent possible (because potential matches having this ratio will have higher match scores).

In some implementations, the system may identify one or more NPCs to serve as an opponent to one or more human players. The system may generate a match score for a group of NPCs and use the match score as a proxy for the group's level of difficulty. For example, a combination of NPCs having higher match scores that resulted from higher values for a match variable related to performance may represent a "more difficult" to beat opponent than those with lower match scores. The system may therefore dynamically select NPC opponents based on match scores and an appropriate level of difficulty to be provided to the player (e.g., more skilled players may be presented with NPCs having higher match scores).

In one implementation, the system may generate NPC profiles analogous to player profiles. In this manner, the system may analyze NPCs in a manner similar to player analysis. The system may therefore continually improve NPC performance and selection based on NPC profiles, which may take into account NPC logic, strategy, and/or other NPC characteristics.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

The invention described herein relates to a matchmaking system and method that facilitates optimization of player matches for multiplayer video games.

Exemplary System Architecture

Figure 1A:
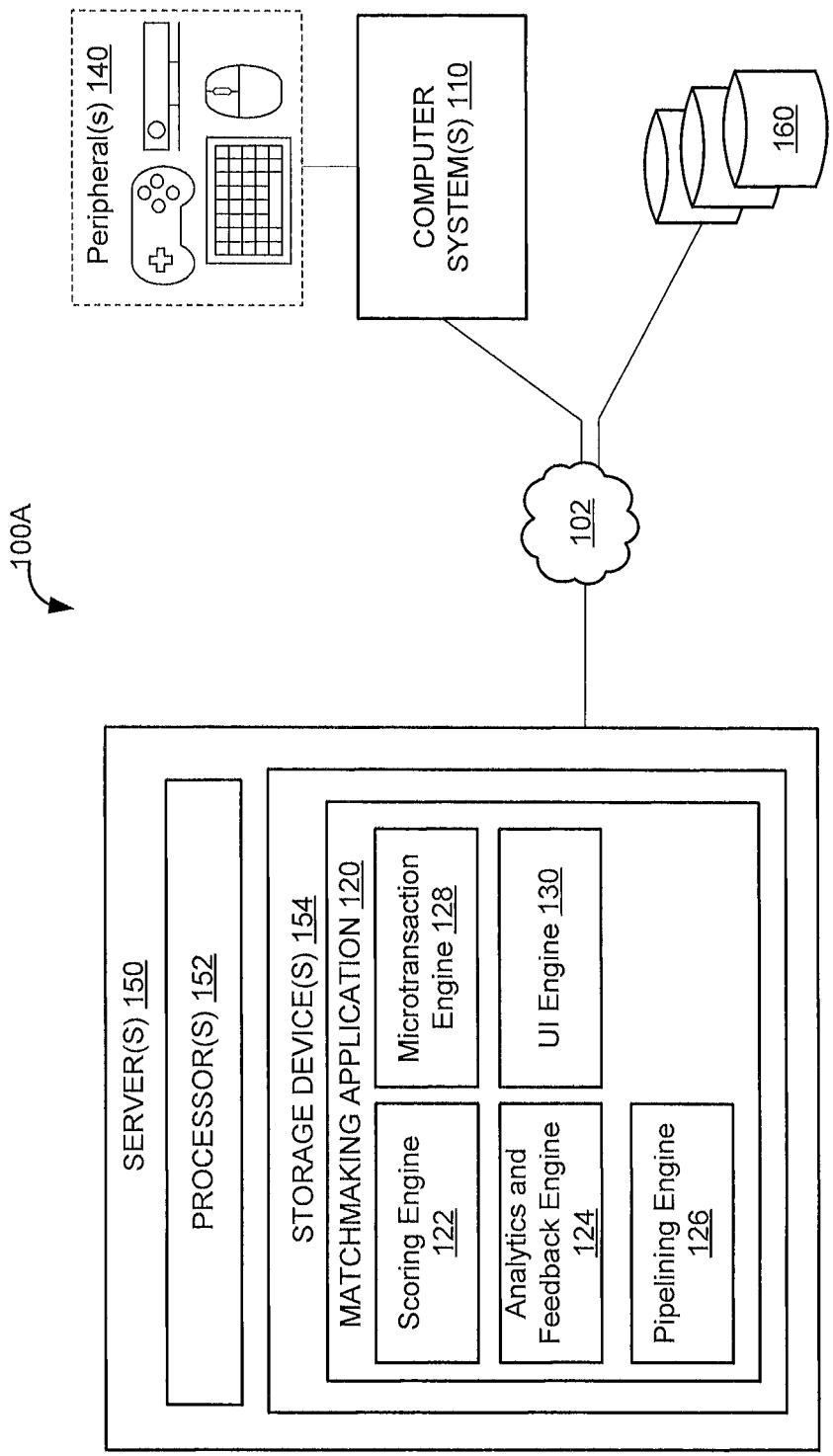
FIG. 1A illustrates an exemplary system for providing matchmaking for multiplayer video games, according to an implementation of the invention.
Figure 1B:
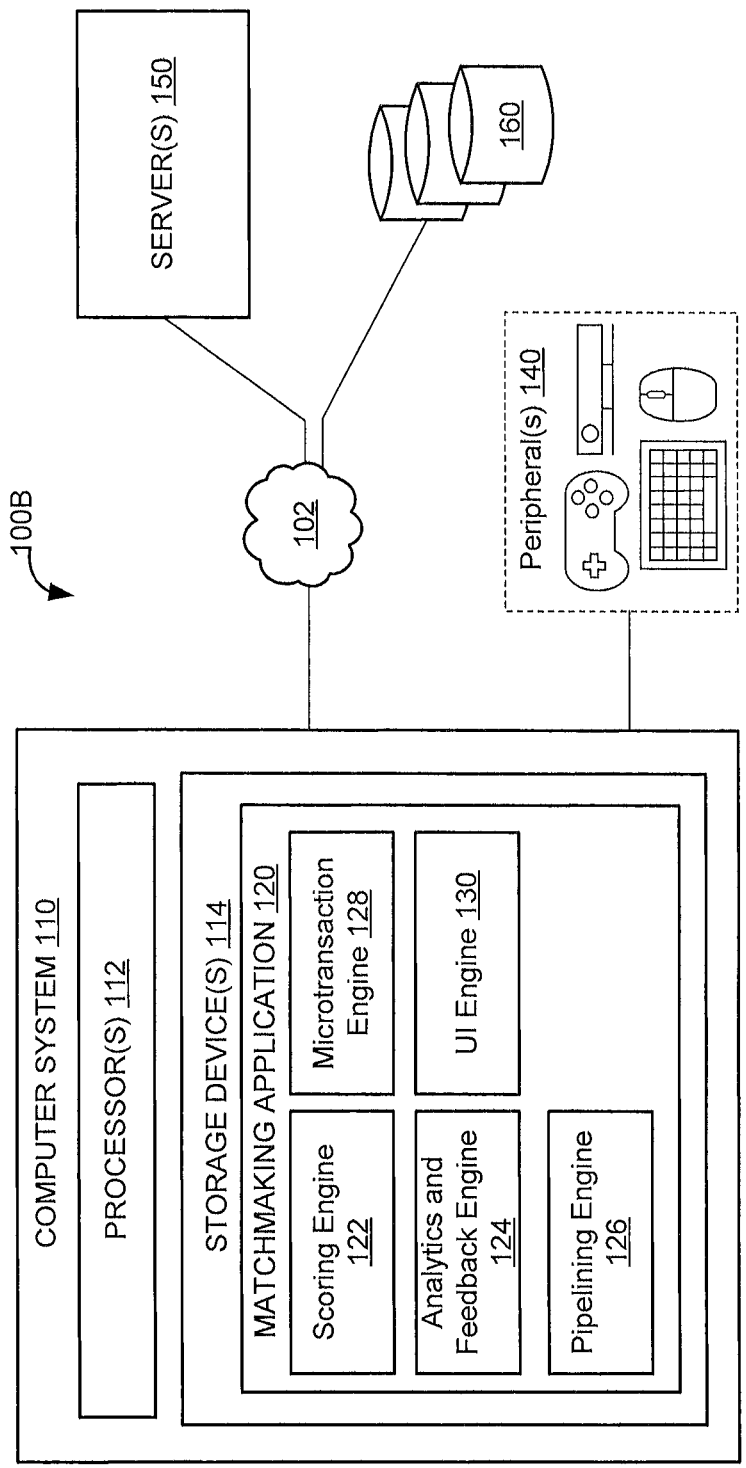
FIG. 1B illustrates an exemplary system for providing matchmaking for multiplayer video games, according to an implementation of the invention.

FIGS. 1A and 1B each illustrate a system for providing matchmaking for multiplayer video games, according to one implementation of the invention. FIG. 1A illustrates an implementation in which server(s) 150 function as a host computer that hosts gameplay between other devices, such as computer system(s) 110. FIG. 1B illustrates an implementation in which a given computer system 110 functions as a host computer that hosts gameplay between (or with) other devices, such as other computer system(s) 110. Unless specifically stated otherwise, the description of various system components may refer to either or both of FIGS. 1A and 1B.

The system may generate a match (e.g., interchangeably referred to herein as engaging in "matchmaking") between two or more players (e.g., one or more human players and/or one or more non-player characters). In some instances, the match, if accepted by the matched players, may result in initiation of a gameplay session that includes the matched players. In other instances, the match may result in automatic initiation of a gameplay session without intervention or specific action taken by a matched player to accept the match.

System 100 may be used to score potential matches and determine which match will likely lead to positive gameplay outcomes for the matched players. For example, system 100 may generate matches that are predicted to result in greater performance by the matched players, result in greater satisfaction/enjoyment by the matched players, and/or otherwise will lead to positive gameplay outcomes for the matched players.

In one implementation, system 100 may include one or more computer systems 110, one or more servers 150, one or more databases 160, and/or other components.

Computer System 110

Computer system 110 may be configured as a gaming console, a handheld gaming device, a personal computer (e.g., a desktop computer, a laptop computer, etc.), a smartphone, a tablet computing device, a smart television, and/or other device that can be used to interact with an instance of a video game.

Referring to FIG. 1B, computer system 110 may include one or more processors 112 (also interchangeably referred to herein as processors 112, processor(s) 112, or processor 112 for convenience), one or more storage devices 114 (which may store a matchmaking application 120), one or more peripherals 140, and/or other components. Processors 112 may be programmed by one or more computer program instructions. For example, processors 112 may be programmed by matchmaking application 120 and/or other instructions (such as gaming instructions used to instantiate the game).

Depending on the system configuration, matchmaking application 120 (or portions thereof) may be part of a game application, which creates a game instance to facilitate gameplay. Alternatively or additionally, matchmaking application 120 may run on a device such as a server 150 to determine matches for users in an "online" game hosted by server 150.

Matchmaking application 120 may include instructions that program computer system 110. The instructions may include, without limitation, a scoring engine 122, an analytics and feedback engine 124, a pipelining engine 126, a microtransaction engine 128, a User Interface ("UI") engine 130, and/or other instructions that program computer system 110 to perform various operations, each of which are described in greater detail herein. As used herein, for convenience, the various instructions will be described as performing an operation, when, in fact, the various instructions program the processors 112 (and therefore computer system 110) to perform the operation.

Peripherals 140

Peripherals 140 may be used to obtain an input (e.g., direct input, measured input, etc.) from a player. Peripherals 140 may include, without limitation, a game controller, a gamepad, a keyboard, a mouse, an imaging device such as a camera, a motion sensing device, a light sensor, a biometric sensor, and/or other peripheral device that can obtain an input from and/or relating to a player. Peripherals 140 may be coupled to a corresponding computer system 110 via a wired and/or wireless connection.

Server 150

Server 150 may include one or more computing devices.

Referring to FIG. 1A, Server 150 may include one or more physical processors 152 (also interchangeably referred to herein as processors 152, processor(s) 152, or processor 152 for convenience) programmed by computer program instructions, one or more storage devices 154 (which may store a matchmaking application 120), and/or other components. Processors 152 may be programmed by one or more computer program instructions. For example, processors 152 may be programmed by gaming instructions used to instantiate the game.

Depending on the system configuration, matchmaking application 120 (or portions thereof) may be part of a game application, which creates a game instance to facilitate gameplay. Alternatively or additionally, portions or all of matchmaking application 120 may run on computer system 110 or server 150.

Matchmaking application 120 may include instructions that program server 150. The instructions may include, without limitation, a scoring engine 122, an analytics and feedback engine 124, a pipelining engine 126, a microtransaction engine 128, a User Interface ("UI") engine 130, and/or other instructions that program server 150 to perform various operations, each of which are described in greater detail herein.

As used herein, for convenience, the various instructions will be described as performing an operation, when, in fact, the various instructions program the processors 152 (and therefore server 150) to perform the operation.

Although illustrated in FIG. 1 as a single component, computer system 110 and server 150 may each include a plurality of individual components (e.g., computer devices) each programmed with at least some of the functions described herein. In this manner, some components of computer system 110 and/or server 150 may perform some functions while other components may perform other functions, as would be appreciated. The one or more processors (112, 152) may each include one or more physical processors that are programmed by computer program instructions. Thus, either or both server 150 and computer system 100 may function as a host computer programmed by matchmaking application 120. The various instructions described herein are exemplary only. Other configurations and numbers of instructions may be used, so long as the processor(s) (112, 152) are programmed to perform the functions described herein.

Furthermore, it should be appreciated that although the various instructions are illustrated in FIG. 1 as being co-located within a single processing unit, in implementations in which processor(s) (112, 152) includes multiple processing units, one or more instructions may be executed remotely from the other instructions.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) (112, 152) may be programmed by one or more additional instructions that may perform some or all of the functionality attributed herein to one of the instructions.

The various instructions described herein may be stored in a storage device (114, 154) which may comprise random access memory (RAM), read only memory (ROM), and/or other memory. The storage device may store the computer program instructions (e.g., the aforementioned instructions) to be executed by processor (112, 152) as well as data that may be manipulated by processor (112, 152). The storage device may comprise floppy disks, hard disks, optical disks, tapes, or other storage media for storing computer-executable instructions and/or data.

The various components illustrated in FIG. 1 may be coupled to at least one other component via a network, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1, as well as in other drawing Figures, different numbers of entities than those depicted may be used. Furthermore, according to various implementations, the components described herein may be implemented in hardware and/or software that configure hardware.

The various databases 160 described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

Figure 2A:
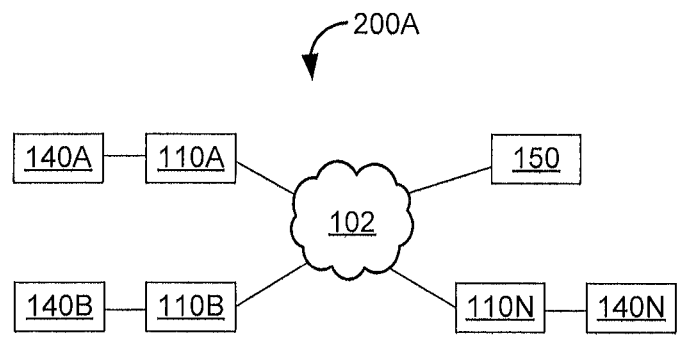
FIG. 2A illustrates an exemplary system configuration in which a server hosts a plurality of computer devices to facilitate a multiplayer game, according to an implementation of the invention.

FIG. 2A illustrates an exemplary system configuration 200A in which a server hosts a plurality of computer devices to facilitate a multiplayer game, according to an implementation of the invention. In one implementation, one or more servers 150 (illustrated in FIG. 1) may host a number of computer systems 110 (illustrated as computer systems 110A, 110B, . . . , 110N) via a network 102. Each computer system 110 may include one or more peripherals (illustrated as peripherals 140A, 140B, 140N). In this manner, one or more servers 150 may facilitate the gameplay of different players using different computer systems 110 and/or otherwise provide one or more operations of matchmaking application 120 (illustrated in FIG. 1).

In some instances, a given server 150 may be associated with a proprietary gameplay network system, such as, without limitation, SONY PLAYSTATION NETWORK, MICROSOFT XBOX LIVE, and/or another type of gameplay network system. In this implementation, a given computer system 110 may be associated with a particular type of gaming console. Other types of computer systems 110 using other types of gameplay networks may be used as well.

Figure 2B:
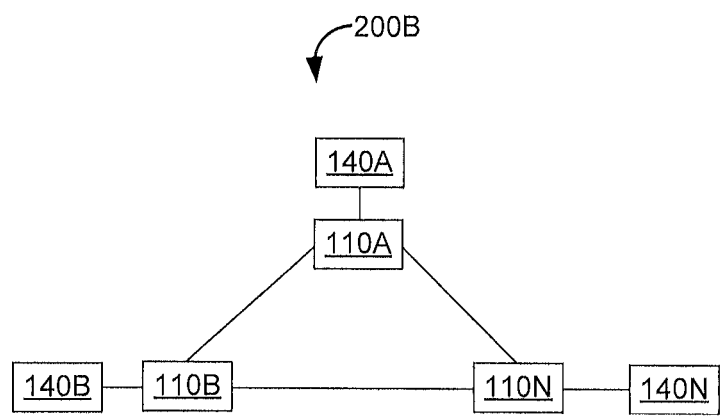
FIG. 2B illustrates an exemplary system configuration in which a plurality of networked servers communicate with one another to facilitate a multiplayer game, according to an implementation of the invention.

FIG. 2B illustrates an exemplary system configuration 200B in which a plurality of computer systems 110 are networked together to facilitate a multiplayer game, according to an implementation of the invention. Any one or more of the computer devices 110 may serve as a host and/or otherwise provide one or more operations of matchmaking application 120 (illustrated in FIG. 1).

Figure 2C:
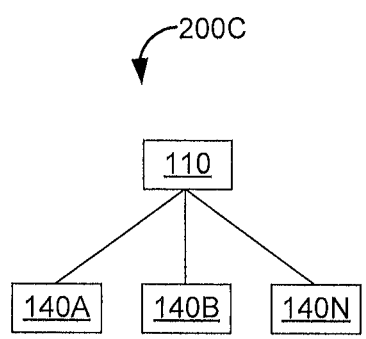
FIG. 2C illustrates an exemplary system configuration in which a plurality of computer devices are networked together to facilitate a multiplayer game, according to an implementation of the invention.

FIG. 2C illustrates an exemplary system configuration 200C in which a computer system 110 is used by a plurality of users to facilitate a multiplayer game, according to an implementation of the invention. In an implementation, computer system 110 may be considered to host the multiplayer game and/or otherwise provide one or more operations of matchmaking application 120 (illustrated in FIG. 1).

Referring to FIGS. 2A-2C, in an implementation, a host may facilitate the multiplayer game by generating match scores, selecting potential matches, performing analytics, making soft reservations, influencing game-related purchases, and/or performing other operations described herein. In an implementation, at least some of these operations may also or instead be performed by one or more individual computer systems 110. Furthermore, the illustrated system configurations are exemplary only and should not be viewed as limiting in any way. Other system configurations may be used as well, as would be appreciated by those having skill in the art.

In an implementation, system 100 may identify players that are waiting to be matched, such as players whose characters are waiting in a virtual game lobby to join a gameplay session. System 100 may generate one or more potential matches by grouping two or more of the identified players and/or adding at least one of the identified players to an existing potential match. The number of players placed in each potential match may depend on a number of players waiting to be matched, a number of players needed for a game session (e.g., a number of players needed to form a team), a number of players that can be accommodated by a game session, and/or other information.

Generating a Match Score for Potential Matches

According to an aspect of the invention, scoring engine 122 may generate a match score for a potential match based on one or more match variables associated with each player in the potential match. A match score may be generated for each potential match and may be used to determine an optimal mix of players in a grouping to produce the most satisfying player experiences. In other words, a match score may indicate a predicted level of satisfaction of players that are placed in a potential match. A match variable may be obtained from a memory (e.g., a database), measured by scoring engine 122, and/or otherwise obtained by scoring engine 122.

The one or more match variables may relate to at least one player's characteristic that may influence whether a player enjoys gameplay while placed in a match. For example, and without limitation, a match variable may include a latency between players (e.g., a delay time for data communication between players' gaming systems or platforms such that lower latency is preferentially matched), a player skill level, a team composition (e.g., a role played by each player of a potential match), a presence or absence of preferred players (e.g., clan members, friends, etc.), a time that a player has waited to be matched (e.g., a player having a longer wait time may be preferentially matched), a location of a player (e.g., players geographically close to one another may be preferentially matched), one or more explicit user preferences received from a player, and/or other match variables.

Assigning and Tuning Coefficients to Customize the Importance of Match Variables A given match variable may be associated with a corresponding coefficient that indicates a level of importance of the given match variable. A game designer or others may assign a default value to one or more coefficients. For example, a match variable related to a composition of a team may, by default, be more important than a match variable related to latency and may therefore be weighted more heavily when generating a match score. Other match variables may be weighted as well.

The coefficient may be expressed as a multiplier, a percentage, and/or other value that can be used to weight a match variable relative to one or more other match variables. The coefficient may be set to zero (or an equivalent metric) such that the given match variable is not considered when generating a match score. For example, if the latency variable is assigned with a coefficient of zero (or other value that indicates that latency should not be used), scoring engine 122 may ignore the latency variable when generating a match score. In this manner, a game designer or others may determine which match variables will be used to generate match scores and/or weights for the match variables. Alternatively or additionally, the game designer or others may remove match variables from consideration altogether (and/or add new match variables).

A given coefficient may be tuned by modifying the default value to generate a tuned value, which may be used instead of the default value. In an implementation, two or more coefficients may be tuned together. For example, a first match variable may be de-emphasized by adjusting a first coefficient downward while a second match variable may be emphasized by adjusting a second coefficient upward. In this manner, one match variable may be weighted more heavily and another match variable may be weighted less heavily. In some instances, the tuning of one coefficient may necessarily result in the tuning of another coefficient. For example, when the value of a coefficient is expressed as a ratio that sums to 1, increasing the value of a first coefficient may necessitate decreasing the value of a second coefficient.

A coefficient may be tuned in various ways (and responsive to various conditions) to adjust how its corresponding match variable will be weighted. A tuned coefficient may itself be iteratively tuned. In this manner, the generation of match scores, and therefore matches made, may be tuned according to particular needs, preferences, changing conditions, and/or other information. For example, a game developer, a player, scoring engine 122, and/or others may tune the coefficients.

A game designer or match administrator (e.g., a computerized or human game session moderator), for example, may tune one or more coefficients based on what the game designer or match administrator believes are more important match variables, and/or based on game requirements to suit the particular game for which matchmaking is performed. In one example, a game designer may assign relatively high coefficients (e.g., high relative to other coefficients) to a match variable related to latency for games in which a high degree of collaboration with other players is required.

In some instances, a player may tune one or more coefficients (e.g., coefficients originally assigned by a game developer or others) according to user preferences through a game User Interface, a settings interface, or other interface. For example, a player may indicate a preference to play with friends, in which case the player may tune a coefficient associated with a match variable that relates to preferred players such that the coefficient is weighted more heavily than other coefficients. The tuned coefficient may affect a matchmaking decision.

For example, a potential match that includes the player and strangers may receive a low value for the match variable related to the presence of preferred players. The tuned coefficient may cause the low value to affect the overall match score more so than other match variables. Thus, the corresponding match score may be skewed toward a value that indicates a poor match and the potential match will not be selected. In this manner, tuning of one or more coefficients by the player may impact match scores and therefore matchmaking decisions.

In another example, the player may tune a coefficient related to game roles to be high (to more heavily weight game roles when considering a match score) and set a value of a match variable related to game roles to be "sniper." In this example, a potential match in which the player would play using a sniper role (e.g., those matches where a sniper role is possible or otherwise available) will have a higher match score than a potential match in which the player would not play as a sniper role. In this manner, the player may indicate a preference for being matched in a gameplay session in which the player plays as a sniper role.

In yet another example, a player may value a better match over shorter wait times. The player may therefore tune a coefficient related to wait times to be low (or zero) so that wait times are not weighted heavily (or at all) when generating potential matches for the player.

According to an aspect of the invention, scoring engine 122 may tune the one or more coefficients based on changing circumstances, game history, and/or other analytical data. For example. If a given player has performed poorly during previous game sessions (as determined from historical gameplay information), scoring engine 122 may adjust one or more coefficients for the player such that gameplay becomes easier for the player. For example, if a player has been getting killed at a rate higher than the player's historical rate, scoring engine 122 may dynamically tune a coefficient associated with a match variable related to skill level to match him with easier opponents, higher-skilled collaborative team members, game sessions that are more suited to the player's gameplay style (e.g., a map that favors snipers), and/or other coefficients that can affect the outcome of a match score.

Scoring engine 122 may also tune the one or more coefficients based on system requirements unrelated to user preferences or game design. For example, scoring engine 122 may determine (e.g., measure or receive an indication) that a load on a given server that offers minimal latency compared to other servers needs to be reduced and load-balanced onto another server with greater latency. In this scenario, scoring engine 122 may adjust the coefficient related to the latency match variable so that latency is disregarded or its importance in generating a match score is diminished (for potential matches that would have been hosted by the given server). In another example, scoring engine 122 may determine that a given server is associated with a higher network cost and should be avoided. Scoring engine 122 may adjust coefficients for match variables that may affect whether a potential match will play on the given server, in order to minimize or eliminate matches that will use the given server.

Table 1 (depicted below) illustrates a non-limiting example of four match variables, their corresponding coefficients, and resulting match score for a potential match between two more players. Table 1 is presented solely for illustrative purposes and should not be viewed as limiting. Any number of other match variables and coefficients may be used. Furthermore, other techniques to generate the match score may be used as well.

TABLE 1

| Match Variable | Value of Match Variable | Coefficient | Weighted Value |
| --- | --- | --- | --- |
| Latency | 8 | 0.1 | 0.8 |
| Team Composition | 2 | 0.5 | 1.0 |
| Skill Level | 9 | 0.4 | 3.6 |
| | Match Score: | | 5.4 |

As illustrated in Table 1, each of three exemplary match variables (latency, team composition, and skill level) may be normalized to have a value that ranges from 0 to 10 (e.g., "0" referring to a "poor" value, and 10 referring to a "good" value—although other numerical values and/or ranges may be used). The coefficients may be expressed as a ratio that sums to one. Thus, tuning one coefficient will cause another coefficient to be tuned as well. In this manner, the match score may be have a maximum value of 10 (10 being the best match score and zero being the worst match score). In the foregoing example, the various values may be based on percentiles from a population of players. For example, the $95^{th}$ to $100^{th}$ percentile may be associated with a value of "10", the $90^{th}$ to $95^{th}$ is "9", 80 to 90 is 8, etc. The percentile ranges may be equal in size or different in size.

For instance, a match variable related to latency may be associated with a value of 8. In this case, latency is considered to be "good" for the group of players in the potential match. In other words, latency between devices associated with the group of players is considered to be low. The precise translation between the actual latency measurement (which may be measured in milliseconds) and a value of a match variable (in this example, 8) may be made using a predefined translation scale. Other match variables may be similarly translated from corresponding raw measurements or data. A value of the coefficient corresponding to the match variable related to latency may be set (e.g., by default or tuned) to be 0.1, indicating a relatively low importance relative to the other coefficients. The weighted value is 8×0.1, or 0.8.

The match variable related to team composition may be a relatively low 2, indicating that a good mix of players for the particular gameplay session is "poor." However, the value of the corresponding coefficient may be a relatively high 0.5, indicating that team composition is relatively important for the gameplay session. The weighted value is 2×0.5, or 1.0.

The value of the match variable related to skill level is a relatively high 9, indicating that the level of skill of the players is a good mix for the gameplay session. The value of the corresponding coefficient is a relatively high 0.4. Thus, the weighted value is 9×0.4, or 3.6.

Summing the weighted values of all match variables, the match score for the potential match may be determined to be 5.6.

In an implementation of the invention, scoring engine 122 may score a match based on emulating match variables that are used to match players who are experiencing actual conditions similar to virtual or game conditions. For instance, an external match variable may include, without limitation, a time of day, weather conditions, trending news, and/or other environmental or contextual information.

Use of the time of day external match variable may take into account a virtual time of day with actual time of day for potential players. For example, scoring engine 122 may favor matches that include players from actual (physical)

locations that correspond to nighttime (e.g., as determined based on the geographic location, current time, and sunset time) for a gameplay session involving a nighttime game (virtual) scene. Use of the weather conditions may be similarly used as well (e.g., snow scenes in a gameplay session may be used to match players having actual, physical, snow at their geographic location). In this manner, players may be matched that are experiencing similar environmental conditions as other players and an in-game environmental conditions, more fully immersing such players in a given gameplay session.

Use of trending news or other contextual information may take into account such contextual information. For instance, scoring engine 122 may be used to emulate current events at a location (e.g., a high profile police chase occurring at a particular city may be used to match players interested in racing games or match players who live in the particular city). In this manner, the emulating match variables may be used to generate match scores to emulate current events or other contextual information.

Selecting Potential Matches

Scoring engine 122 may select a potential match based on match scores. For example, scoring engine 122 may determine whether a match score exceeds a predefined threshold match score. The predefined match score may be determined as a function of a wait time. (e.g., a duration of time in which a player has been waiting to be matched, such as in game lobby). For example, scoring engine 122 may lower the threshold match score (assuming higher match scores are associated with higher match quality) when a given player has been waiting to be matched for a predetermined period of time. In some instances, the system may progressively lower the threshold match score as the player continues to wait to be matched until the player is eventually matched. In this manner, the system may allow a player to be matched using lower quality matches if the player has been waiting to be matched.

The threshold match score may further be adjusted, as described below with respect to analytics and feedback engine 124.

If the threshold match score is exceeded, scoring engine 122 may automatically select the potential match (thereby making a match) or present the potential match to a player for selection (e.g., confirmation that the player would like to join a game session with the players from the potential match).

If multiple potential matches are being considered, scoring engine 122 may automatically select the potential match having the highest match score, automatically select a potential match based on aggregate potential matches, randomly (and automatically) select a potential match that exceeds the threshold match score, present one or more potential matches that exceed the threshold match score to the player for selection, and/or present all potential matches to the player for selection.

When automatically selecting a potential match based on aggregate potential matches, scoring engine 122 may take into account other potential matches such that each player is matched into a match of at least threshold quality, but maximizing scores across more than just one match. In other words, scoring engine 122 may take into account aggregate scores for multiple matches. For example, if player A is considering matches Y (having a match score=6) and Z (having a match score=8) and player B is considering matches W (having a match score=7) and X (having a match score=8), scoring engine 122 may select match W for player B if by selecting X it forces player A into match Y. That is, the aggregate score of player A placed into match Z and player B placed into match W is 7+8=15. An aggregate score of player B placed into match X and player A placed into match Y is 8+6=14.

When presenting either a single match or multiple potential matches to the player for selection, scoring engine 122 may provide match description information that describes the match so that the player can make a selection based on the provided information. The match description information may include, without limitation, one or more match scores, one or more match variables, one or more coefficients, and/or other information to the user so that the user may make a selection based on the provided information. For example, an exemplary match description may include the following: likely two other clan members included in a gameplay session, 100 millisecond average latency, five-versus-five gameplay, average "good" skill level, spread of skill level, map, player styles, and/or other information.

Figure 3:
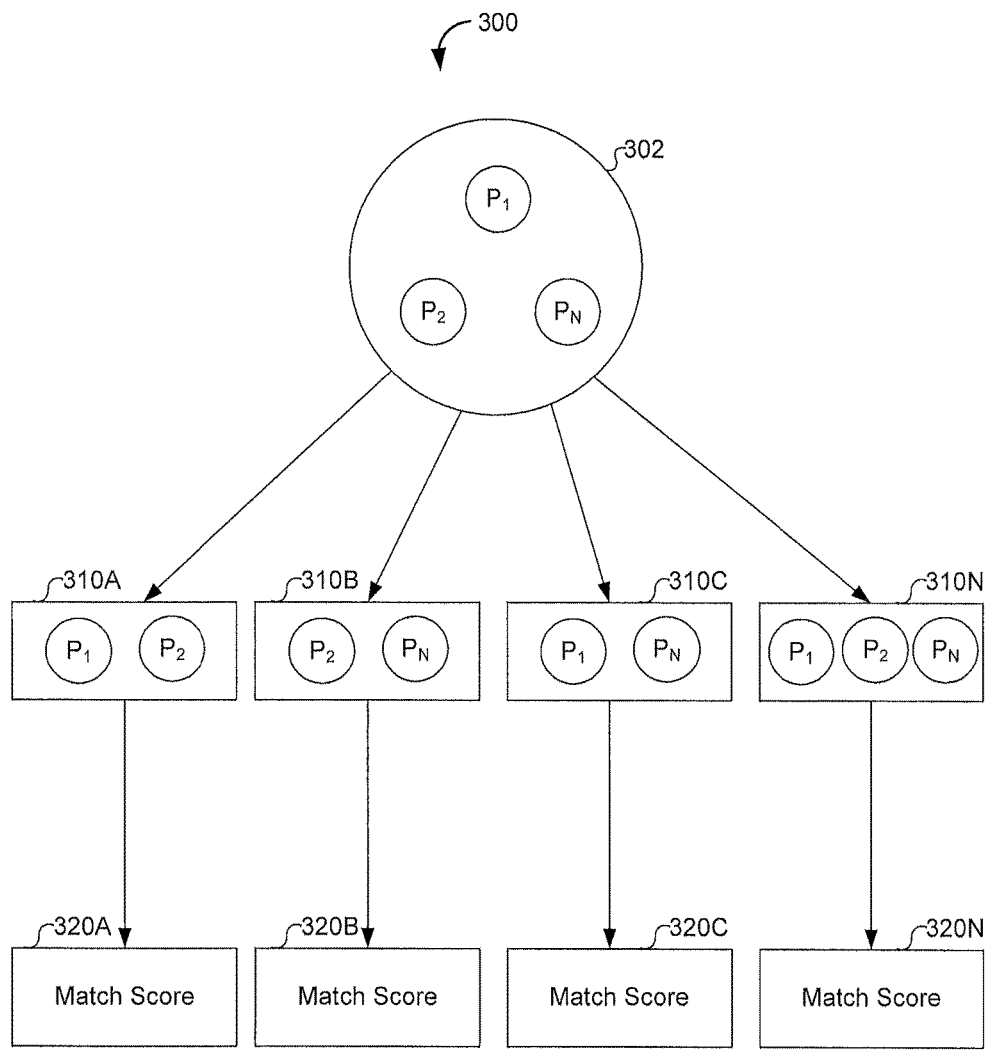
FIG. 3 depicts a schematic diagram illustrating the generation of an initial match between players, according to an implementation of the invention.

FIG. 3 depicts a schematic diagram 300 illustrating the generation of an initial match between players, according to an implementation of the invention. Various players (P) (illustrated in FIG. 3 as players $P_1, P_2, \ldots,$ and $P_N$), may be waiting to be matched to start a gameplay session. For example, players (P) may be waiting in a game lobby 302. The system may identify one or more potential matches 310 (illustrated in FIG. 3 as matches 310A, 310B, 310C, . . . , 310N) between one or more players (P). Different potential matches 310 may include different combinations of different players (P), which may include different numbers of players (P). The system may generate potential matches 310 randomly (e.g., randomly place players into a potential match), all potential matches (e.g., consider all combinations of players waiting to be matched), some subset of all potential matches (e.g., consider all combinations of within a geographic region or based on a maximum latency) and/or based on a player profile of each player (e.g., make potential matches based on preferences to be matched with friends).

In one implementation of the invention, the system may assess possible matches driven through rules or machine learning heuristics that facilitate searching various permutations of potential matches in a reasonable time. In some instances, the system may filter out certain matches using such rules or machine learning heuristics. For example, the system may filter out unfavorable matches (and matches of similar composition) and unfavorable combinations of players. In particular, if players A and B are deemed to be incompatible (as determined from one or more rules or heuristics), the system may ignore (e.g., not consider) any potential matches involving players A and B. In this manner, the search space of potential matches may be reduced.

Each potential match 310 may be assigned with a match score 320 (illustrated in FIG. 3 as match scores 320A, 320B, 320C, 320N). A potential match 310 may be automatically selected based on its corresponding match score 320, or may be presented to players (P) involved in the potential match 310 for selection by each player. For example, a potential match 310 may be automatically selected if its corresponding match score 320 crosses (e.g., meets or exceeds) a threshold match score. In some instances, a potential match 310 may be selected to achieve higher level goals, such as higher overall aggregate scores, as described herein. Likewise, a potential match 310 may be provided to players (P) for selection if its corresponding match score 320 crosses a threshold match score. In some implementations, players (P) may be presented with a predefined number of potential matches 310 (e.g., the top 3 matches or the top 3 matches crossing a certain threshold match score).

Figure 4:
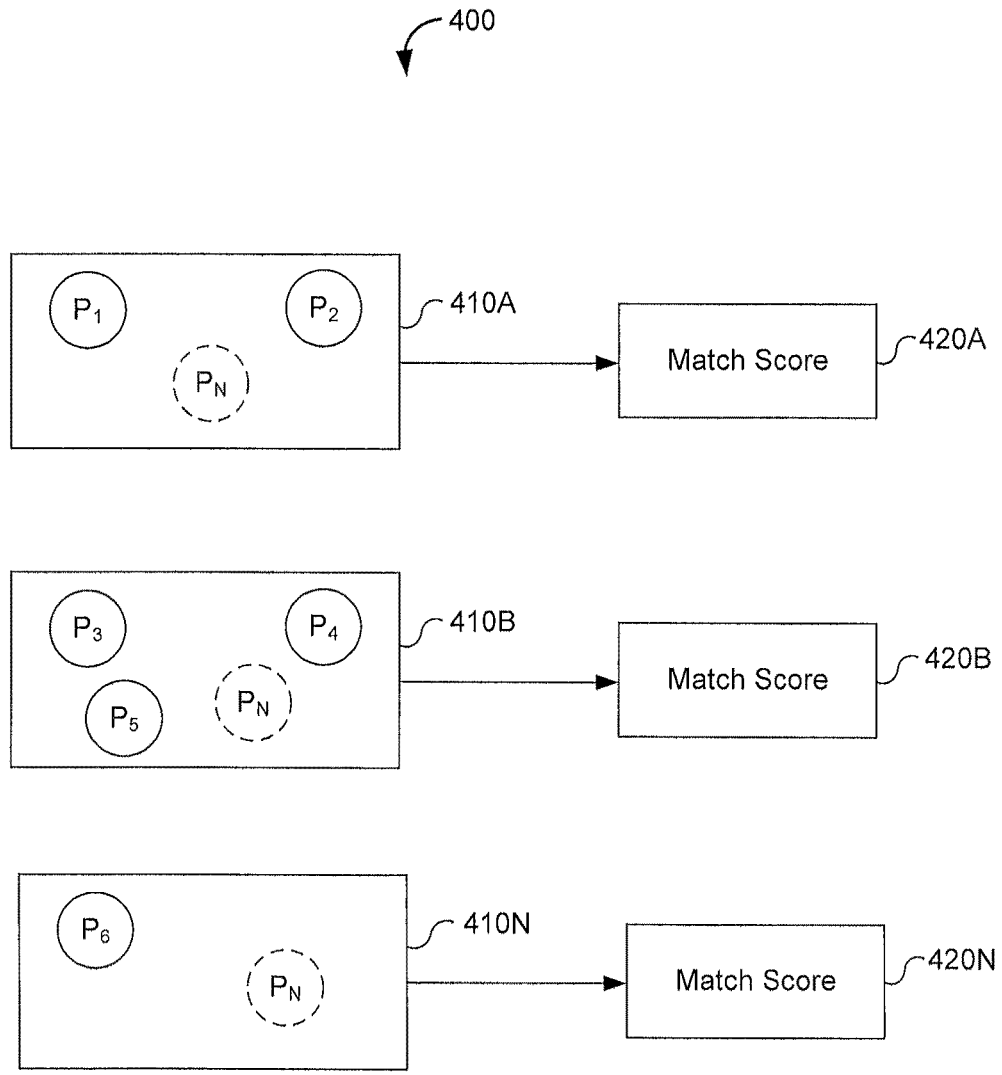
FIG. 4 depicts a schematic diagram illustrating the addition of a player to a group of matched players, according to an implementation of the invention.

FIG. 4 depicts a schematic diagram 400 illustrating the addition of a player to a group of matched players, according to an implementation of the invention. Potential matches 410 (illustrated in FIG. 4 as potential matches 410A, 410B, . . . , 410N) may be formed with existing players (P), illustrated in FIG. 4 as players $P_{1-6}$) who are awaiting the addition of new players to start a gameplay session. A player $P_N$ may be waiting to matched. The system may place player $P_N$ (for scoring purposes) into each potential match 410 to generate a corresponding match score 420 (illustrated in FIG. 4 as match score 420A, 420B, 420N). The system may automatically select a potential match 410 to place player $P_N$ into or may present the potential matches 410 to player $P_N$ for selection. Such automatic selection or presentation to player $P_N$ for selection may be based on a determination of whether a corresponding match score 420 crosses a threshold match score. In an implementation, before player $P_N$ is placed in a potential match 410, the system may request approval from existing players $P_{1-6}$ in that potential match. In an implementation, the system may provide the existing players $P_{1-6}$ and/or $P_N$ with match scores, player profiles, and/or other information so that each player may make informed decisions about their matches.

Generating a Quality Score for Gameplay Sessions

Referring back to FIG. 1, scoring engine 122 may generate match scores in order to predict good quality matches that will lead to satisfying gameplay for players in a match. In order to make such predictions in a meaningful way, the system may identify match variables, coefficients, threshold scores, and/or other information that are correlated with good match quality. However, to do so may require an understanding of what constitutes "good match quality" (e.g., whether or not gameplay was satisfying).

Analytics and feedback engine 124 may generate a quality score for a gameplay session to obtain an understanding of what constitutes "good match quality." The quality score may indicate a level of satisfaction by one or more players involved in a gameplay session. For example, a quality score may indicate a level of satisfaction of an individual player involved in the gameplay session, all players involved in the gameplay session, all players belonging to a particular clan or team, all players belonging to a particular role (e.g., snipers, archers, point guards, etc.), and/or others involved in the gameplay session. When relating to more than one player, a quality score may include an average, a median, and/or other cumulative statistic that represents an overall level of satisfaction of multiple players. In this manner, analytics and feedback engine 124 may provide an analytical framework that uses gameplay statistics and information to assess a quality of a given gameplay session as experienced by one or more players.

In some instances, analytics and feedback engine 124 may take into account the level of satisfaction of all the players in a given gameplay session. For instance, analytics and feedback engine 124 may determine that a "good match quality" is one in which each player achieved a certain level of satisfaction. In this manner, analytics and feedback engine 124 may assign a higher quality score to a first match in which each player achieved a certain level of satisfaction than a second match in which only some of the players achieved a high level of satisfaction but other players achieved a low level of satisfaction (even if some, but not all, of the players in the second match achieved a much higher level of satisfaction than the players in the first match). Thus, analytics and feedback engine 124 may help to ensure that 100% of the players of a given match have a good experience versus ensuring that 80% of the players have a great experience and 20% of the players have a bad experience.

Analytics and feedback engine 124 may determine a quality score based on one or more quality factors that are used to gauge whether gameplay associated with a given match was satisfying. A quality factor may include an observable metric that indicates a player's level of satisfaction with gameplay.

Examples of quality factors include, without limitation, a player quitting a match or gameplay session while other players are still playing (indicating dissatisfaction), a duration of a game session (e.g., a longer duration may indicate greater satisfaction), a gameplay performance factor (e.g., a kill-to-death ratio in a shooter game, a lap time in a racing game, etc., where greater performance may indicate greater satisfaction), a player engagement factor (e.g., a speed of player input, a level of focus as determined from camera peripherals, etc., where greater engagement may indicate greater satisfaction), a competition level of a game (e.g., whether lopsided or not, where evenly matched games may indicate greater satisfaction), a biometric factor (e.g., facial expressions, pulse, body language, sweat, etc.), explicit feedback from a player (e.g., responses to a survey), and/or other observable metrics related to gameplay.

In some implementations of the invention, analytics and feedback engine 124 may determine a quality score based on one or more business factors that describe a business value derived from a given gameplay session. For example, and without limitation, a business factor may include a business concern such as an amount of revenue derived from a given gameplay session (e.g., number or amount of in-game purchases, number of impressions of an advertisement or other ad-based revenue stream, etc.), a level of customer engagement, and/or other information that can be used to assess a level of value derived from a given gameplay session. It should be noted that analytics and feedback engine 124 may generate a quality score based on a combination of one or more quality factors and one or more business or customer engagement factors may be used as well.

Training the Quality Scoring System and Adjusting the Threshold Quality Score

Analytics and feedback engine 124 may identify quality factors that correlate with an a priori (accepted as true) quality of a gameplay session. For example, and without limitation, explicit feedback from a player may serve as an a priori quality of a gameplay session. In this example, analytics and feedback engine 124 may identify quality factors that correlate with explicit feedback from a player. In a particular example, analytics and feedback engine 124 may determine that long game sessions (e.g., game sessions that exceed a predefined amount of time) strongly correlate with explicit feedback from players that indicate they enjoyed their respective gameplay sessions. On the other hand, using the same or different explicit feedback, analytics and feedback engine 124 may determine that a competition level is not correlated to the quality of the gameplay session. By analyzing various gameplay sessions over time, analytics and feedback engine 124 may identify relevant quality factors that reflect a true quality of gameplay sessions.

In a similar manner, analytics and feedback engine 124 may determine a threshold quality score that should be used to identify good quality gameplay sessions. A threshold quality score may be used as a cutoff to determine which quality scores represent "good quality" gameplay sessions (and therefore matches associated with those gameplay sessions). For example, based on a priori information regarding quality (e.g., explicit player feedback), analytics and feedback engine 124 may identify a minimum quality score that correlates with a good quality gameplay session and use the minimum quality score as a basis for the threshold quality score. By analyzing various gameplay sessions over time, analytics and feedback engine 124 may continually refine the quality threshold score.

A quality score may be used to profile games that result in satisfying gameplay, profile players to determine their interests, and/or fine tune match scores. In this sense, the quality scoring system may provide an analytical framework in which to assess information that results in satisfying gameplay and in particular to identify matches that should be made.

Generating Game and Player Profiles

Analytics and feedback engine 124 may generate a game profile for a gameplay session based on gameplay information, which may be monitored and/or otherwise obtained by analytics and feedback engine 124. Gameplay information may describe various game characteristics of a gameplay session that may influence the quality of gameplay. For example, gameplay information may include, without limitation, a number of players, types of roles (e.g., snipers), types of in-game items used or purchased (e.g., weapons, vehicles, armor, custom suits, custom paint, tires, engine modifications, etc.), composition of teams or clans (e.g., number and/or types of roles in each clan), maps or game levels played (e.g., battle zones, racetracks, sporting arenas, etc.), duration of gameplay (e.g., how duration of a given gameplay session), player skill levels, player styles (e.g., aggressive, prefers to be a sniper, etc.), and/or other information related to a gameplay session.

A game profile may be specific for a given gameplay session (e.g., different game profiles may be associated with different gameplay sessions) and/or may be used to generate a broader game profile for a particular game (e.g., different games may be associated with different game profiles). In this manner, a given game or gameplay session may be characterized using a game profile.

Analytics and feedback engine 124 may likewise generate a player profile for a player based on player information. The player information may be monitored and/or otherwise obtained by analytics and feedback engine 124. The player information may describe various characteristics of a player, which may be used to assess whether the player will enjoy a given gameplay session, a match, and/or a game.

For example, player information may include, without limitation, a style of gameplay (e.g., aggressive), a role preference (e.g., an explicit indication by the player of such preference), a role actually played, a duration of gameplay sessions, a number of gameplay sessions played in a given login session, in-game items used or purchased by the player, membership in a clan or team, preference to play with clan mates or friends, demographic information of the player (e.g., geographic location, gender, income level, etc.), win/loss records, scores, and/or other information that may be used to determine whether a player will enjoy a given gameplay session, a match, and/or a game.

Information from a player profile may be indexed by time. For example, the foregoing player information may include all player information known about a player, a subset of all information (e.g., information related to the last day, week, month, previous "N" number of game sessions, login sessions, etc.). In this manner, a player profile may relate to all-time gameplay of the player, recent gameplay of the player, time of day (e.g., a player may be associated with different player profiles at different times of the day, such as having an aggressive play style during evening hours and a more relaxed play style during morning hours), and/or other subset.

The game profiles, the player profiles, and/or other information described herein may, for example, be stored in one or more profile databases, such as a database 160.

Applying the Game Profiles, Player Profiles, and Quality Scores to Tune Match Scores Analytics and feedback engine 124 may correlate information from a game and/or player profile with quality scores determined for a gameplay session. For example, a game profile may include certain characteristics that are correlated with a high quality gameplay session. For a given game, a particular combination of role types (e.g., four snipers, six run-and-gunners, and four resource campers) for a gameplay session may be correlated with high quality scores, indicating that the players involved in the given gameplay session enjoyed playing the game.

Using such correlations, analytics and feedback engine 124 may drive the tuning of match variables and/or coefficients. For example, analytics and feedback engine 124 may determine that types of roles are important considerations when matchmaking and therefore scoring engine 122 should use and assign a high coefficient to match variables related to types of roles. In particular, scoring engine may make matches based on a clan composition of different types of roles, as informed by the correlation of the composition of roles to quality scores.

Other information from game profiles and/or player profiles may be used as well. Furthermore, different permutations and combinations of game profile and player profile information may be correlated with quality scores so that matches align with high quality scores. For example, a combination of types of game maps and player styles may be correlated with high quality scores based on observations of gameplay sessions having different game maps and player styles. The combination may be used to identify match variables and/or tune coefficients in a manner that leads to higher match scores for matches that include the combination of game maps and player styles. In this manner, analytics and feedback engine 124 may provide an automated process to provide feedback on match score generation. In particular, analytics and feedback engine 124 may identify match variables that are important indicators of match quality and tune coefficients in a manner that more accurately predicts match quality.

In an implementation, using subsets of the player profile information, analytics and feedback engine 124 may tune matchmaking in real-time for a given player. For example, if a player is determined to be on a losing streak within the past several gaming sessions, analytics and feedback engine 124 may cause a coefficient related to player skill level to become more important. This may result in, for example, the player being pitted against lower-skilled opponents and/or teamed with higher-skilled players to increase the chance that the player will win or otherwise perform better.

Making Soft Reservations for Subsequent Gameplay Sessions

According to an aspect of the invention, pipelining engine 126 may generate one or more "soft reservations" for a player based on a match score, a game profile, a player profile, and/or other information. A soft reservation may comprise a match between two or more players for one or more subsequent gameplay sessions that are reserved for the players. The match may be generated as described herein (e.g., based on match scores exceeding a threshold match score). Pipelining engine 126 may anticipate an interest in a subsequent gameplay session (e.g., based on a game profile and/or a player profile) and make a soft reservation for two or more players. For example, a soft reservation may be generated before the players have expressed an interest in the subsequent gameplay sessions.

For example, and without limitation, pipelining engine 126 may analyze a game progression of a player (e.g., which may be stored in a player profile) and predict a game mode (e.g., capture the flag) that will likely interest the player. Pipelining engine 126 may then make a soft reservation for the player for a gameplay session that includes the game mode.

In another example, pipelining engine 126 may determine whether clan members or friends of a given player have logged on. Upon obtaining information that indicates that a player's clan members or friends have logged on and that the player prefers to play with clan members or friends, pipelining engine 126 may make a soft reservation for the player to play in a subsequent gameplay session with the clan members or friends.

In an implementation, pipelining engine 126 may continuously place players who are currently logged on and/or playing in a gameplay session into potential matches, assess the potential matches as described herein, and make soft reservations for potential matches having match scores that exceed a match threshold score. For example, pipelining engine 126 may match a player who is already playing in a current gameplay session so that the player may join a subsequent gameplay session when the current gameplay session ends (e.g., the player completes the gameplay session and then joins the future gameplay session) or is otherwise exited by the player (e.g., the player quits the current gameplay session early to join the subsequent gameplay session). In this manner, a player may be pre-matched with other players for a subsequent gameplay session while the player is still playing in a current gameplay session.

In some instances, a match score for a player may be influenced by soft reservations. For instance, a player for whom a soft reservation has been made for a gameplay session that starts in ten minutes may be preferentially placed in a match for a second gameplay session that is expected to last less than ten minutes. In this example, the system may score matches for which gameplay sessions are expected to last less than ten minutes higher than those that are expected to last more than ten minutes (or otherwise eliminate any potential matches associated with gameplay sessions expected to last greater than ten minutes).

In an implementation, pipelining engine 126 may make a soft reservation for a player who has not yet logged on based on a history of previous logins. For example, if a given player is observed to login to play in one or more gameplay sessions at a certain time, pipelining engine 126 may predict that the given player will login at the certain time and make a soft reservation for the given player. In this manner, pipelining engine 126 may predict when a given player will login and make a soft reservation for the given player before the given player logs in such that a time to wait to be matched is minimized.

Managing the Start of Gameplay Sessions Associated with Soft Reservations

Once a soft reservation has been made, a player may be invited to join an associated gameplay session. The player may accept the invitation, in which case the player may start playing in the gameplay session. On the other hand, if the player rejects the invitation, then other players may be invited to join the gameplay session to replace the player. Such acceptances and rejections may be added to a player profile so that future soft reservations may be fine-tuned based on acceptances (which may indicate a relevant soft reservation was made) and rejections (which may indicate a non-relevant soft reservation was made).

Because a player may reject an invitation to join a gameplay session associated with a soft reservation, pipelining engine 126 may make soft reservations for a number of players that exceeds a maximum number allowed by a given gameplay session. For example, if a maximum number players in a clan for a gameplay session is ten, pipelining engine 126 may make a soft reservation for a greater number of players (e.g., fifteen) for the gameplay session. In this manner, pipelining engine 126 may expect a certain number (e.g., five in the foregoing example) of rejections to be made and may therefore "overbook" the number of soft reservations (hereinafter, "overbook number").

An overbook number may be predefined or automatically determined based on a game profile, a player profile, and/or other information. For example, certain game modes, games, players, etc., may be associated with a propensity to accept soft reservations than others. Pipelining engine 126 may monitor such tendencies over time to dynamically adjust the overbook number for a game mode, a game, a player, etc.

In one implementation, pipelining engine 126 may score players for which a soft reservation has been made (for a gameplay session) such that top-scored players are invited first to join the gameplay session. The scoring may be based on respective match scores for each player (e.g., players having the highest match scores will be scored higher).

In an implementation, a player for which a soft reservation has been made (for a gameplay session) may be added to the gameplay session "in progress" (after it has started). For example, a player who has a soft reservation for a particular gameplay session may join the particular gameplay session after the player's current gameplay session is over. In this manner, the particular gameplay session may be reserved for the player even after the gameplay session has started. In other instances, a soft reservation for a player may be cancelled if the player is unavailable (e.g., still playing in another gameplay session, is logged off, etc.) when a gameplay session for which the soft reservation relates has started or is about to start. In this manner, other players may be matched to play in the gameplay session.

Pipelining engine 126 may require a player to join the particular gameplay session within a predefined time after the particular gameplay session has started. In this manner, the particular gameplay session may be reserved for the player for only a limited time. After the expiration of the predefined time, pipelining engine 126 may remove the soft reservation for the player. To fill the opening (resulting from removal of the player), pipelining engine 126 may invite or otherwise allow another player (who may or may not have a soft reservation) to join the particular gameplay session.

In an implementation, allowing a player to join after the gameplay session has started and/or allowing other players to join the particular gameplay session to fill any openings may be subject to approval by players who have joined the gameplay session. For example, pipelining engine 126 may present a prompt to the other players (e.g., via their individual game UI), who may allow or disallow such delay and/or addition.

Scheduling Gameplay Sessions to Minimize Wait Times

A player waiting to be matched into a future gameplay session may be required to wait for the future gameplay session to start. For example, a first player who prefers to play with friends may prefer to wait to be matched with friends, instead of being placed into a gameplay session with only strangers. If the two friends of the first player are currently playing in a gameplay session, which has not yet completed, pipelining engine 126 may make a soft reservation for the three players to play together in a future gameplay session.

In the meantime, the first player can continue to wait until the two friends are available or may join a gameplay session that pipelining engine 126 determines will likely finish at approximately the same time that the two friends' gameplay session is expected to finish. For example, pipelining engine 126 may determine that the two friends will complete their gameplay session in ten minutes and may match the first player into a gameplay session that is expected to be complete in ten minutes. In this manner, all three friends may be expected to become available at around the same time.

In one implementation, pipelining engine 126 may coordinate the gameplay sessions for multiple players so that they synchronize to start a subsequent gameplay session (with soft reservations made for each of the players for the subsequent gameplay session). For example, continuing with the foregoing example (in which a player is waiting to be matched with two friends), a first friend's current gameplay session may be expected to end in five minutes, while the second friend's current gameplay session is expected to end in ten minutes. Pipelining engine 126 may place the player into a gameplay session expected to last ten minutes, place the first friend into a gameplay session expected to last five minutes after the first player's gameplay session is over, and wait for the second friend's gameplay session to end in ten minutes. In this manner, multiple players may be synchronized to start a subsequent gameplay session.

In an implementation, pipelining engine 126 may match the first player into a temporary gameplay session with other players who are similarly waiting until their respective future gameplay sessions have started (e.g., when their soft reservations become available). The temporary gameplay session may be such that players may enter and leave at any time so that they may play until their soft reservations become available. Matchmaking for such temporary gameplay sessions may be performed as described herein (e.g., using match scores, game profiles, player profiles, etc.). For example, a temporary gameplay session may include a practice mode area, where game statistics and skill ratings may or may not be affected by gameplay.

In another example, a player may prefer to play a particular type or mode of a game that requires a certain number of players for a match to be made, but the number of currently available players is insufficient. Such preference may be explicitly made by the player and/or be based on a player profile. Pipelining engine 126 may match the player in a gameplay session that is predicted to end when the certain number of players is expected to become available (e.g., based on expected end times of current gameplay sessions for other players, expected number of logons by suitable players who will be able to join the gameplay session, etc.). In an implementation, pipelining engine 126 may place the player into a temporary gaming session described herein until the number of currently available players becomes sufficient.

The number of subsequent gameplay sessions that are "soft" reserved for a player may be based on the expected total logon time for the player (e.g., how long the player is expected to stay logged on) based on a player profile, an expected duration of each of the subsequent gameplay sessions that are scheduled, and/or other information.

Influencing Game-Related Purchases Through Targeted Matchmaking

According to an aspect of the invention, microtransaction engine 128 may arrange matches to influence game-related purchases. Game-related purchases may include an acquisition by a player of an item in exchange for a fee, such as a real currency fee, a virtual currency fee, and/or other type of fee. The item may include an in-game item (e.g., a power-up, virtual weaponry, a virtual vehicle, an extra life, an extended life, etc.), a new level or map, and/or other item that may be used in relation to a game.

For example, microtransaction engine 128 may match a more expert/marquee or otherwise influential player (e.g., clan leader) with a junior player to encourage the junior player to make game-related purchases. A junior player may wish to emulate a marquee player by obtaining weapons or other items used by the marquee player. Other types of pairings and/or other groupings of players may be used as well.

Microtransaction engine 128 may analyze various items used by marquee players and, if at least one of the items is currently being offered for sale (with or without a promotion), match the marquee player with another player (e.g., a junior player) that does not use or own the item. Similarly, microtransaction engine 128 may identify items offered for sale, identify marquee players that use or possess those items, and match the marquee players with other players who do not use or possess those items. In this manner, microtransaction engine 128 may leverage the matchmaking abilities described herein to influence purchase decisions for game-related purchases.

In an implementation, microtransaction engine 128 may target particular players to make game-related purchases based on their interests. For example, microtransaction engine 128 may identify a junior player to match with a marquee player based on a player profile of the junior player. In a particular example, the junior player may wish to become an expert sniper in a game (e.g., as determined from the player profile). Microtransaction engine 128 may match the junior player with a player that is a highly skilled sniper in the game. In this manner, the junior player may be encouraged to make game-related purchases such as a rifle or other item used by the highly skilled sniper.

In an implementation, when a player makes a game-related purchase, microtransaction engine 128 may encourage future purchases by matching the player (e.g., using matchmaking described herein) in a gameplay session that will utilize the game-related purchase. Doing so may enhance a level of enjoyment by the player for the game-related purchase, which may encourage future purchases. For example, if the player purchased a particular weapon, microtransaction engine 128 may match the player in a gameplay session in which the particular weapon is highly effective, giving the player an impression that the particular weapon was a good purchase. This may encourage the player to make future purchases to achieve similar gameplay results.

In an implementation, UI engine 130 may provide a match interface used to interact with match information. For example, a player may tune coefficients using the interface, select potential matches to join (which may include match description information such as match scores, clan compositions, etc.), and/or interact with match information. Through the match interface, a player may be provided with a list of one or more potential matches that may be selected by the player. The list may be ranked according to a match score. The player may select a potential match (and enter a gameplay sessions associated with the selected match) or wait until other potential matches are provided/become available.

The match interface may be provided to the player upon entry into a lobby room, by request, and/or responsive to other inputs.

Clan Formation and Management of Non-Player Characters ("NPCs")

The matchmaking systems and methods herein may be used in contexts in addition to or other than for matching players for a given gameplay session. For example, matchmaking described herein may be applied to clan formation, management of non-player characters ("NPCs"), and/or other applications.

The matchmaking described herein may be used to suggest clans or teams. For example, one or more players may wish to form or join a clan for a given game, but not know what would be an appropriate mix of player styles, player roles, skill levels, and/or other player characteristics that would make an optimal clan, given the player's own characteristics.

The system may identify optimal clan composition based on matchmaking-related information such as, without limitation, a game profile, a player profile (e.g., explicit preferences, purchases made, player styles, player geography, player historical play schedules, etc.), prior match scores, prior quality scores, and/or other information. Optimal clans may be those that have performed successfully (e.g., accomplished the most wins, objectives, etc.), are associated with the highest player enjoyment (e.g., based on quality scores), play together most frequently, and/or are otherwise deemed to be desirable.

The matchmaking described herein may be used to manage NPCs. For example, the system may be used to select/generate a NPC to fill a gap in a clan or team (e.g., a sniper-style NPC), generate a team or clan of NPCs, analyze NPCs post-game to identify successful NPCs, and/or perform other actions with respect to NPCs.

The system may identify a gap in a number of players required for a given gameplay session, such as in a game that requires ten players in a clan, but only nine (or less) human players have joined. In this case, the system may assign one or more NPCs to play along with the human players in the clan. The system may generate potential matches between the human players who have joined and potential NPCs to fill the gaps. The system may score each potential match and select NPCs that are associated with the highest match scores. For example, in a game in which the system has determined that five snipers and five run-and-gunners represent an optimal mix of player roles, the system may select NPCs to fill gaps such that the desire combination of five snipers and five run-and-gunners is achieved to the extent possible (because potential matches having this ratio will have higher match scores).

The system may identify one or more NPCs to serve as an opponent to one or more human players. For example, a combination of NPCs having higher match scores where coefficients related to performance are highly weighted may represent a "more difficult" to beat opponent than those with lower match scores. The system may therefore dynamically select NPC opponents based on match scores and an appropriate level of difficulty to be provided to the player (e.g., more skilled players may be presented with NPCs having higher match scores).

The system may generate NPC profiles analogous to player profiles. In this manner, the system may analyze NPCs in a manner similar to player analysis. The system may therefore continually improve NPC performance and selection based on NPC profiles, which may take into account NPC logic, strategy, and/or other NPC characteristics.

Figure 5:
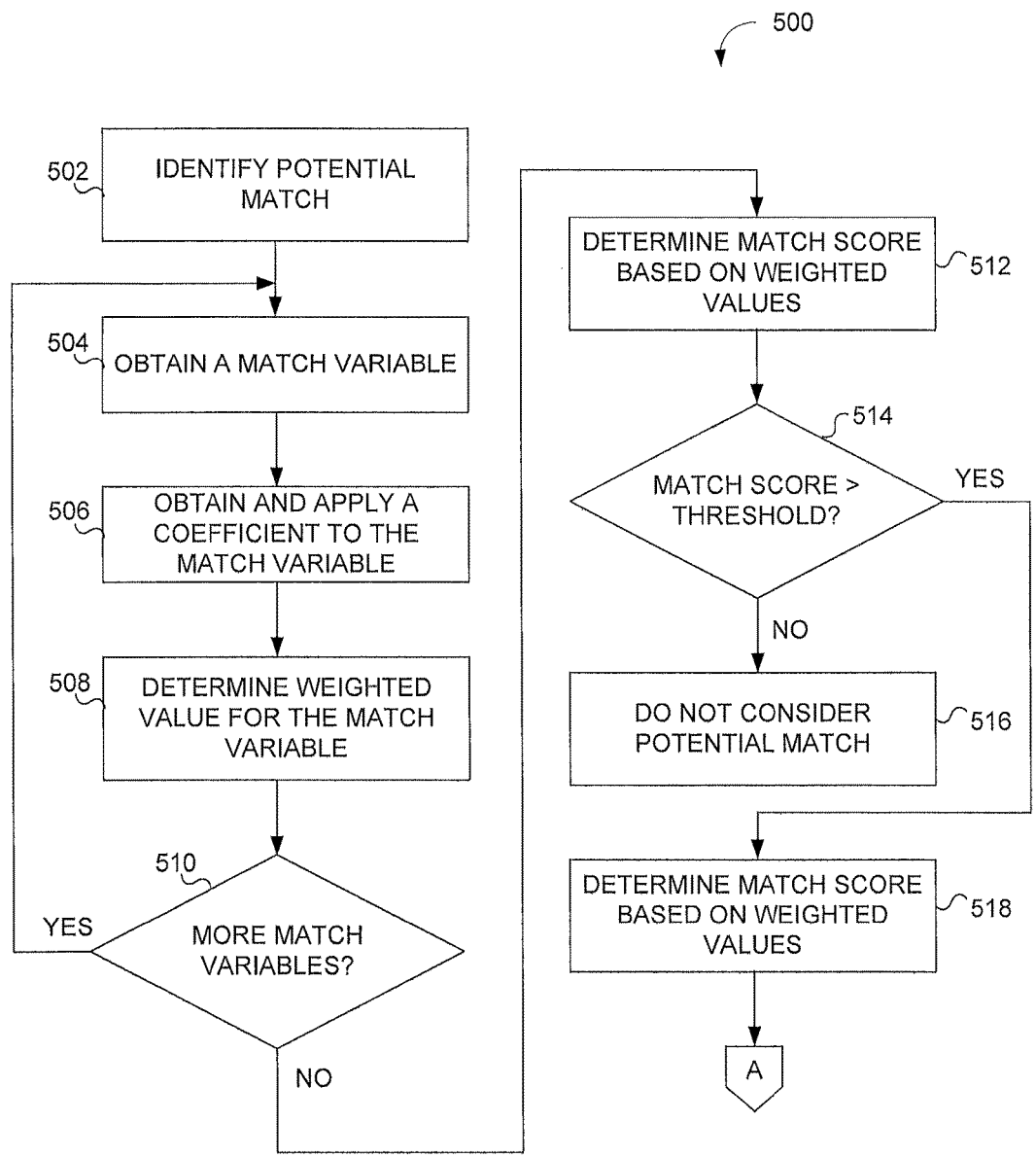
FIG. 5 depicts a process of providing statistical matchmaking for multiplayer video games, according to an implementation of the invention.

FIG. 5 depicts a process 500 of providing statistical matchmaking for multiplayer video games, according to an implementation of the invention. The various processing operations and/or data flows depicted in FIG. 5 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 502, a potential match may be determined. The potential match may include two or more players that may be grouped to play in a gameplay session.

In an operation 504, a match variable related to a potential match may be obtained. A match variable may relate to at least one player's characteristic that may influence whether a player enjoys gameplay while placed in a match. The value of a match variable may be quantified in a normalized manner. For example, a given match variable may be assigned with a value that ranges from, without limitation, 1 to 10. In the examples that follow, 10 will be considered the "best" value and 1 will be considered the "worst" value—although the converse may be true and other values may be used as well. Furthermore, the examples of latency and player preference will be used, although other match variables may be (and typically are) used as well.

A value of a match variable may refer to the potential match as a whole, which may be determined differently for different match variables. For example, a latency match variable may describe an average latency of all players in a potential match such that different ranges of latency are assigned with values ranging from 0 to 10. High latency times (e.g., longer delays) may be associated with a value closer to (or at) 0, while low latency times (e.g., shorter delays) may be associated with a value closer to (or at) 10. The particular arrangement of such values may be predefined and/or tuned as described herein.

In another example, a value for a player preference match variable may be assigned with a value that depends on whether preferences of each of the players in a potential match are fulfilled by the potential match. For example, if all player preferences have been fulfilled (e.g., they will play in the potential match as a player role that they each prefer), then the value for the player preference match variable may be set to 10, while if no player preferences have been fulfilled, then the player preference match variable may be set to zero. The range between zero and 10 may be determined in various ways, such as being dependent on a number of players in the potential match whose player preferences have been fulfilled.

In this manner, each match variable may be associated with a normalized value in order to generate an overall match score for the potential match.

In an operation 506, one or more coefficients may be obtained and applied to the match variables. For example, each match variable may be associated with its corresponding coefficient, which may be defined by game developer, defined by a player, tuned automatically by the system, and/or otherwise defined using a value. The coefficient may be applied to its corresponding match variable to weight, or determine a relative importance of, the corresponding match variable. The coefficient may be expressed as a fraction, a multiplier, and/or other manner to indicate a relative importance of a match variable.

For example, the coefficient may be expressed as a fraction of one such that a sum of all coefficients for all match variables equals one. Assuming only two equally-weighted match variables are used (although other numbers of match variables may be and are typically used), each coefficient may be assigned with a value of 0.5 (e.g., one-half). If a first match variable is three times as important as a second match variable, a first coefficient associated with the first match variable may be assigned with a value of 0.75 while a second coefficient associated with the second match variable may be assigned with a value of 0.25. In this manner, the value of match variables may be weighted with respect to one another.

In an operation 508, a weighted value may be determined for a match variable based on the value of the match variable and its coefficient.

In an operation 510, a determination of whether more match variables are to be considered may be made. If more match variables are to be considered, processing may return to operation 504, where the next match variable to considered may be obtained.

In an operation 512, responsive to a determination that no more match variables are to be considered, a match score for the potential match may be determined based on the weighted values of the match variables. Continuing the foregoing example, a given match score may range from zero to ten. For example, if a latency score is 8 and its coefficient is 0.75, then the weighted value for latency may be 6 (8×0.75). If a player preference score is 4 and its coefficient is 0.25, then the weighted value for player preference may be 1 (4×0.25). The overall match score may be 7 (6+1).

In implementations where a player may tune coefficients, a match score may be custom-generated for that player (because of the use of coefficients specific for that player). Other players in the potential match may be provided with their own custom match scores if they tuned the coefficients as well. Otherwise, a system and/or game provided coefficient may be used.

Figure 6:
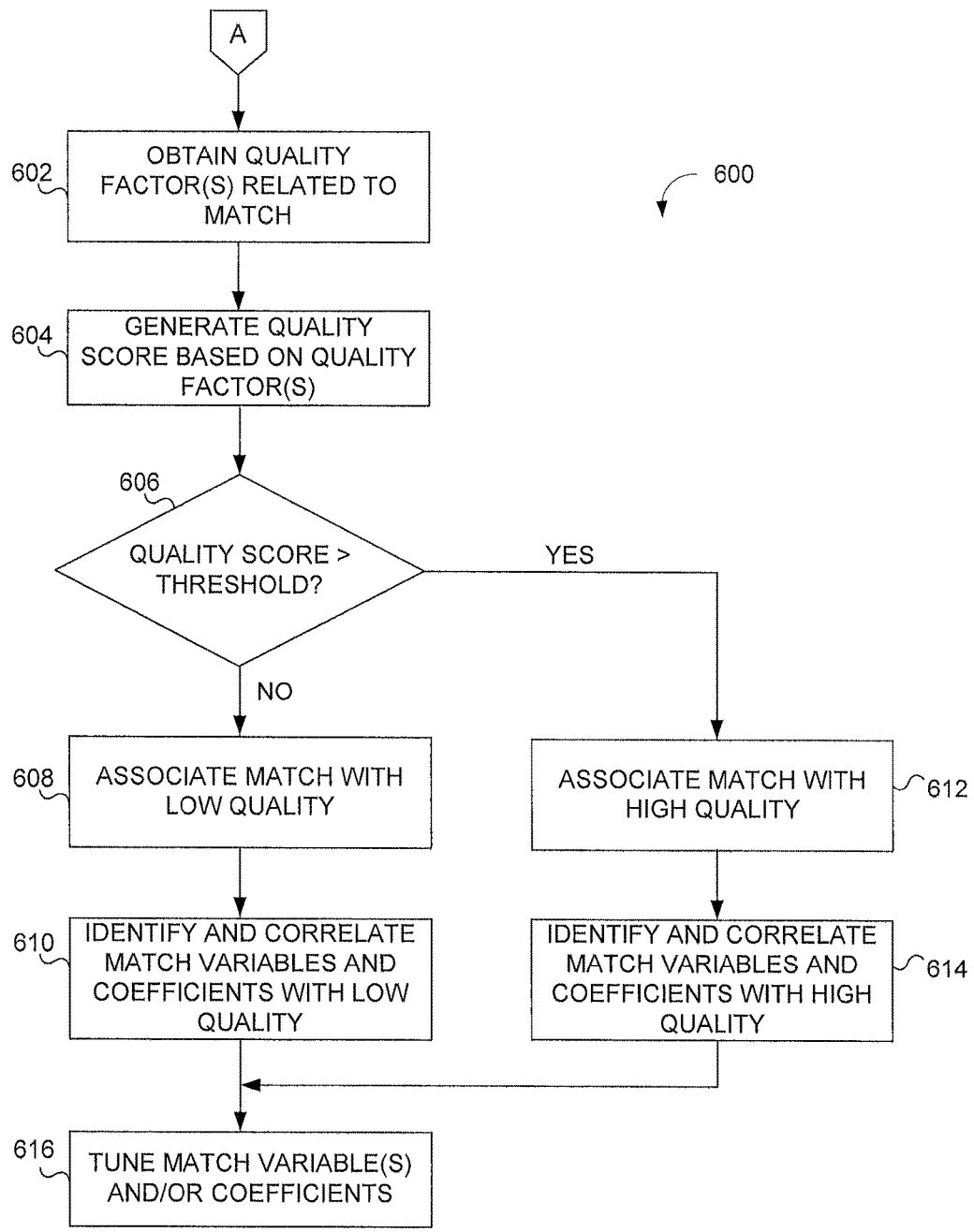
FIG. 6 depicts a process of analyzing matchmaking scores and feedback to fine tune the matchmaking process, according to an implementation of the invention.

In an operation 514, a determination of whether the match score crosses a predetermined match score threshold may be made. If the match score does not cross the predetermined match score threshold, then the potential match may no longer be considered in an operation 516. On the other hand, if the match score crosses the predetermined match score threshold, then the potential match may be automatically selected or provided to the player(s) in the potential match for selection in an operation 518. In an implementation, processing may then proceed to portion "A" of process 600, which is illustrated in FIG. 6. Referring to operations 514, 516, and 518, in an alternative implementation, a predefined number of potential matches or all potential matches (regardless of whether they cross a predetermined match score threshold) may be provided to a player for selection.

FIG. 6 depicts a process 600 of analyzing matchmaking scores and feedback to fine tune the matchmaking process, according to an implementation of the invention. The various processing operations and/or data flows depicted in FIG. 6 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 602, one or more quality factors may be obtained in relation to a selected match (e.g., a match that has been used to initiate a gameplay session). A quality factor may include an observable metric that indicates a player's level of satisfaction with gameplay. The one or more quality factors may be obtained during a gameplay session associated with the selected match to assess a quality of the match during gameplay and/or after the gameplay session has been completed. Each quality factor may be normalized on some predetermined scale (e.g., having values ranging from zero to 10).

In an operation 604, a quality score may be generated based on the one or more quality factors. For example, the one or more quality factors may be summed (or otherwise calculated) to obtain a quality score.

In an operation 606, a determination of whether the quality score crosses a threshold quality score may be made.

In an operation 608, if the quality score does not cross a threshold quality score, a determination that a quality of the match was poor (e.g., undesirable) may be made. In other words, a match may be determined to be unsatisfying for the players involved in the match based on observations and/or analysis of objective metrics associated with a gameplay session for which the match was made. In some instances, a quality score for each individual player in a given session may be generated (as described herein with respect to generating quality scores) and assessed. In this example, individual player statistics may be analyzed for each given match (which may be aggregated with other individual player statistics from other matches). As such, players in a given match may be assessed as a unit and/or individually.

In an implementation, a threshold score may not be used. Instead, one or more ranges of values may correspond to different levels of "poor" quality matches and/or one or more ranges of values may correspond to different levels of "good" quality matches.

In an operation 610, one or more match variables and/or one or more coefficients used to generate a match score for the match may be identified and correlated with a poor quality match. In this manner, process 600 may identify match variables and/or coefficients that tend to result in poor quality matches.

Returning to operation 606, if the quality score crosses a threshold quality score, a determination that a quality of the match was good (e.g., desirable) may be made in an operation 612. In other words, a match may be determined to be satisfying for the players involved in the match based on observations and/or analysis of objective metrics associated with a gameplay session.

In an operation 614, one or more match variables and/or one or more coefficients used to generate a match score for the match may be identified and correlated with a good quality match. In this manner, process 600 may identify match variables and/or coefficients that tend to result in good quality matches.

In an operation 616, the one or more variables and/or the one or more coefficients may be tuned based on whether each are associated with a poor quality match or a good quality match. In addition, a level of tuning may be based on a level of poor quality or a level of good quality.

Figure 7:
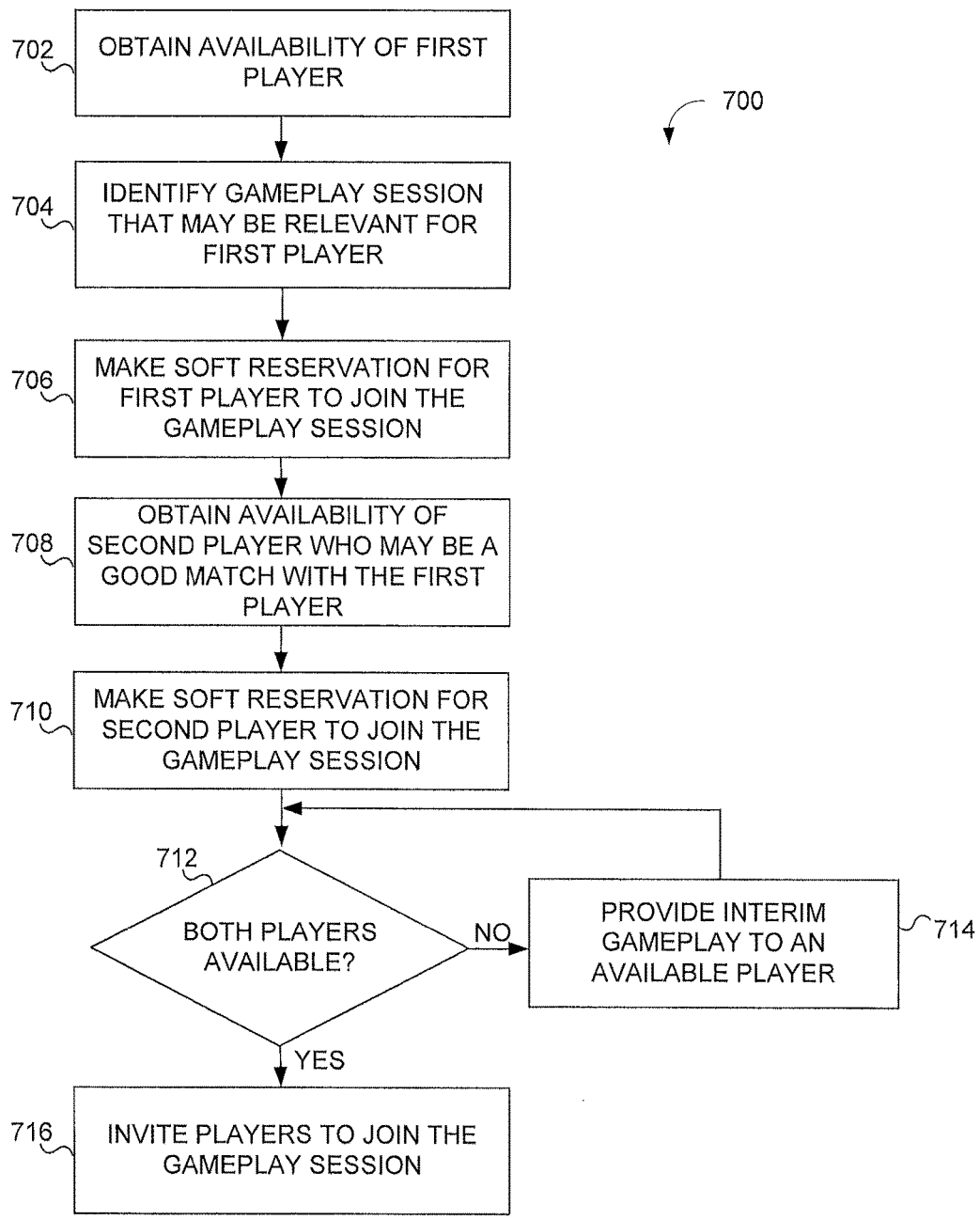
FIG. 7 depicts a process of scheduling gaming sessions, according to an implementation of the invention.

FIG. 7 depicts a process 700 of scheduling gaming sessions, according to an implementation of the invention. The various processing operations and/or data flows depicted in FIG. 7 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 702, first availability information for a first player may be obtained. The first availability information may indicate a time and/or date that a first player will be available to join a gameplay session. For example, the first availability information may include, without limitation, information indicating that the first player is: waiting to be matched, not yet logged on but predicted to login at the indicated time/date, is currently playing in a gameplay session that is expected to end at the indicated time/date, and/or will otherwise become available.

In an operation 704, a subsequent gameplay session that is relevant to (e.g., will likely interest) the first player may be identified based on a game profile, a player profile, and/or other information.

In an operation 706, a soft reservation may be made for the first player to play in the subsequent gameplay session.

In an operation 708, second availability information for a second player who may be interested in playing with the first player and/or playing in the subsequent gameplay session may be obtained. Similar to the first availability information, the second availability information may indicate a time and/or date that a second player will be available to join a gameplay session. The second player's interest in playing with the first player and/or in the subsequent gameplay session may be determined based on a game profile, a player profile, and/or other information.

In an operation 710, a soft reservation may be made for the second player to play in the subsequent gameplay session.

In an operation 712, a determination of whether the first player and the second player will become available at the same time (e.g., when the subsequent gameplay session is set to start) may be made.

In an operation 714, responsive to a determination that the first player and the second player will not become available at the same time (and at least one of the players will become available before the other), an interim gameplay session may be provided to whichever player becomes available to occupy the player until the other player becomes available. Processing may return to an operation 712, where a determination of whether the first player and the second player will become available at the same time is made.

In an operation 716, responsive to a determination that the first player and the second player will become available at the same time, the first and second players may be invited to accept the soft reservation (e.g., start a gameplay session associated with the soft reservation).

Figure 8:
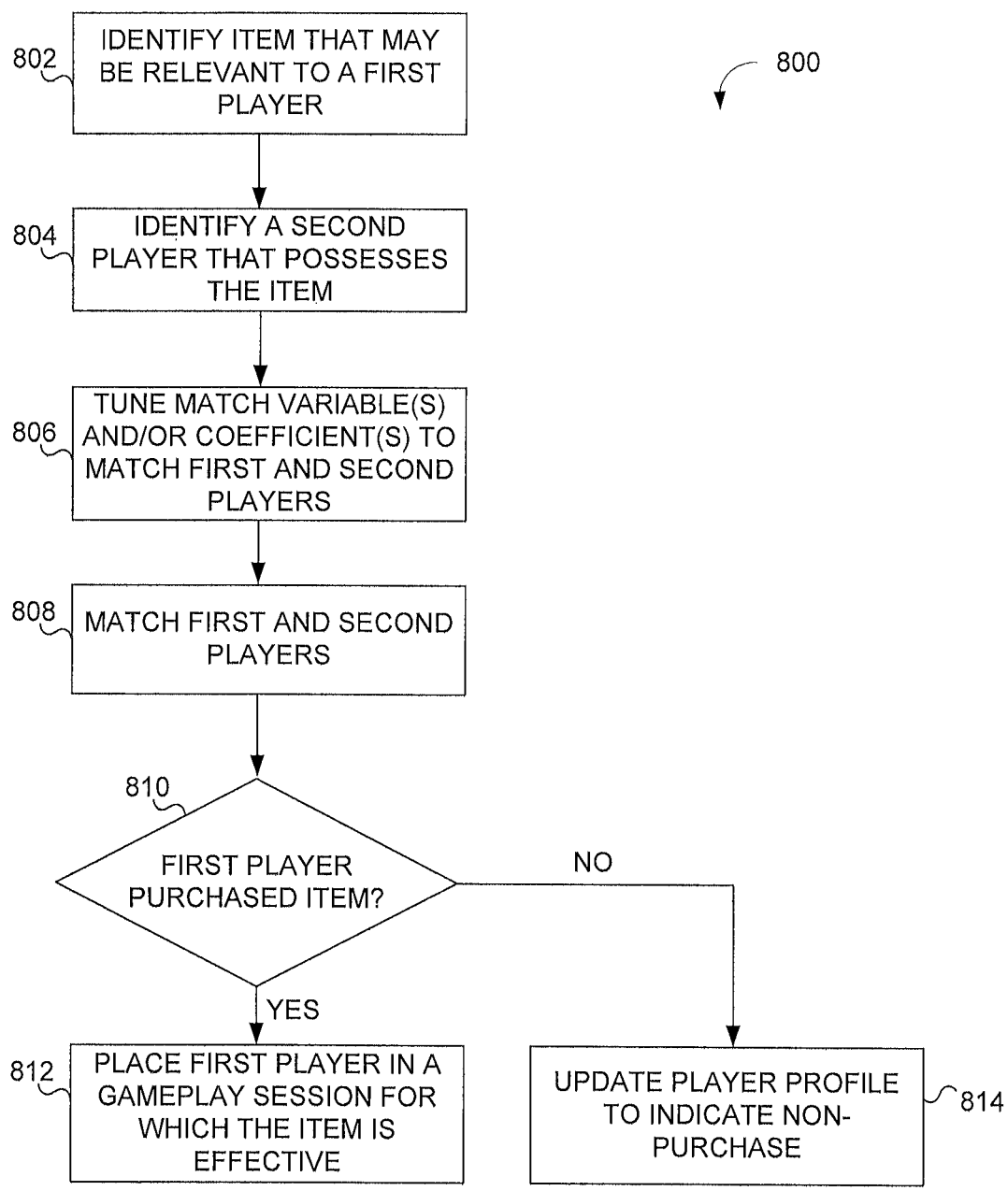
FIG. 8 depicts a process of influencing in-game purchases through targeted matchmaking, according to an implementation of the invention.

FIG. 8 depicts a process 800 of influencing in-game purchases through targeted matchmaking, according to an implementation of the invention. The various processing operations and/or data flows depicted in FIG. 8 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 802, an in-game item that may be relevant for (e.g., of interest to) a first player may be identified. The in-game item may be identified based on a preference of the first player (e.g., a desire to play as a sniper may cause sniper weapons to be identified), and/or a usefulness to a player (e.g., an in-game item that may be suited for a particular level that the player has repeatedly failed may be identified).

In an operation 804, a second user that has acquired (e.g., purchased), used, or otherwise possesses the in-game item may be identified.

In an operation 806, a value of a match variable and/or a coefficient related to the match variable may be tuned to cause a match score between the first player and the second player to increase (or otherwise indicate a good match) to thereby increase a likelihood (or guarantee) that the first player and the second player will be matched.

In an operation 808, the first player and the second player may be matched based on the match score such that the first player and the second player play in a gameplay session.

In an operation 810, a determination of whether the first player purchased the in-game item may be made. For example, process 800 may monitor the activity of the first player during and/or after the gameplay session or otherwise obtain purchase information of the first player.

In an operation 812, responsive to a determination that the first player purchased the in-game item, the player profile may be updated to reflect the purchase and the first player may be matched (e.g., match variables and/or coefficients tuned) to play a second gameplay session in which the in-game item is suitable to be used. For example, if the in-game item is a weapon (e.g., an accurate and powerful sniper rifle), the second gameplay session may be selected because the weapon is highly effective in the second gameplay session. Doing so may encourage the first player to make subsequent purchases due to the satisfaction of effectively using the in-game item during the second gameplay session.

In an operation 814, responsive to a determination that the first player did not purchase the in-game item, the player profile may be updated to reflect such non-purchase so that future targeted marketing of in-game items and other game-related purchases may be adjusted based on what has not been successful at enticing a given player to make a game-related purchase.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A computer-implemented method of recommending the composition of a group of players in a multi-player game based on values of match variables weighted by corresponding coefficients used to generate a match score for the group of players, the method being implemented by a plurality of client devices that are remote from and in data communication with a host computer, wherein data communication between the plurality of client devices is characterized by a delay time, and wherein the host computer has one or more physical processors programmed with computer program instructions that, when executed by the one or more physical processors, cause the host computer to perform the method, the method comprising:

identifying, by the host computer, a benchmark group of players comprising a first plurality of players that have played together during a prior gameplay session of a multi-player game;

identifying, by the host computer, a coefficient associated with the benchmark group of players, wherein the coefficient is a function, at least in part, of the delay time;

generating, by the host computer, a first potential match of a first plurality of players to play as a group in a gameplay session of a multi-player game;

obtaining, by the host computer, a value of a match variable associated with the first plurality of players, wherein the match variable corresponds to the identified coefficient;

determining, by the host computer, a first match score for the first potential match based on the value of the match variable and the identified coefficient; and determining, by the host computer, whether to recommend the first potential match based on the first match score.

2. The method of claim 1, the method further comprising:

generating a second potential match of a second plurality of players;

obtaining a second value of the match variable associated with the second plurality of players;

determining a second match score for the second potential match based on the second value of the match variable and the identified coefficient; and comparing the first match score with the second match score, wherein the determination of whether to recommend the first potential match is based on the comparison.

3. The method of claim 1, wherein the benchmark group of players is identified based on a level of performance exhibited by the benchmark group of players in the prior gameplay session.

4. The method of claim 1, wherein the match variable relates to a composition of players, and wherein the coefficient weights an importance of the composition of players in forming a given group of players.

5. The method of claim 4, wherein a value of the match variable relates to a combination of types of roles played by individual players in the given group of players.

6. The method of claim 1, the method further comprising:

determining a number of the first plurality of players is insufficient to form a full group of players; and identifying a non-player character that should be added to the first potential match based on the based on the impact of the non-player character on the first match score.

7. The method of claim 1, the method further comprising:

wherein each of the first plurality of players comprises a non-player character such that a group of non-player characters is formed.

8. The method of claim 7, wherein the first match score is used as a proxy for a level of difficulty associated with the first plurality of players, the method further comprising:

selecting a group of human players to play adversarially against the first plurality of players based on a collective skill level of the group of human players and the first match score.

9. A system of recommending the composition of a group of players in a multi-player game based on values of match variables weighted by corresponding coefficients used to generate a match score for the group of players, the system comprising:

a plurality of game modules executing on client devices, each of the client devices being used by one of the group of players to play the multi-player game, wherein data communication between the plurality of game modules is characterized by a delay time;

a host computer remote from, and in data communication with, the plurality of game modules, wherein the host computer has one or more physical processors programmed with computer program instructions that, when executed by the one or more physical processors, cause the host computer to:

identify a benchmark group of players comprising a first plurality of players that have played together during a prior gameplay session of a multi-player game;

identify a coefficient associated with the benchmark group of players, wherein the coefficient is a function, at least in part, of the delay time;

generate a first potential match of a first plurality of players to play as a group in a gameplay session of a multi-player game;

obtain a value of a match variable associated with the first plurality of players, wherein the match variable corresponds to the identified coefficient;

determine a first match score for the first potential match based on the value of the match variable and the identified coefficient; and determine whether to recommend the first potential match based on the first match score.

10. The system of claim 9, wherein the host computer is further programmed to:

generate a second potential match of a second plurality of players;

obtain a second value of the match variable associated with the second plurality of players;

determine a second match score for the second potential match based on the second value of the match variable and the identified coefficient; and compare the first match score with the second match score, wherein the determination of whether to recommend the first potential match is based on the comparison.

11. The system of claim 9, wherein the benchmark group of players is identified based on a level of performance exhibited by the benchmark group of players in the prior gameplay session.

12. The system of claim 9, wherein the match variable relates to a composition of players, and wherein the coefficient weights an importance of the composition of players in forming a given group of players.

13. The system of claim 12, wherein a value of the match variable relates to a combination of types of roles played by individual players in the given group of players.

14. The system of claim 9, wherein the host computer is further programmed to:

determine a number of the first plurality of players is insufficient to form a full group of players; and identify a non-player character that should be added to the first potential match based on the based on the impact of the non-player character on the first match score.

15. The system of claim 9, wherein the host computer is further programmed to:

wherein each of the first plurality of players comprises a non-player character such that a group of non-player characters is formed.

16. The system of claim 15, wherein the first match score is used as a proxy for a level of difficulty associated with the first plurality of players, and wherein the host computer is further programmed to:

select a group of human players to play adversarially against the first plurality of players based on a collective skill level of the group of human players and the first match score.

17. A computer-readable medium having computer program instructions stored thereon for recommending the composition of a group of players in a multi-player game based on values of match variables weighted by corresponding coefficients used to generate a match score for the group of players, wherein the computer program instructions are distributed between a host computer and a plurality of game modules executing on client devices, wherein each of the client devices is configured to be used by one of the group of players to play the multi-player game, wherein data communication between the plurality of game modules is characterized by a delay time, wherein the host computer is remote from, and in data communication with, the plurality of game modules, and wherein the computer program instructions, when executed by one or more physical processors of the host computer, cause the host computer to:

identify a benchmark group of players comprising a first plurality of players that have played together during a prior gameplay session of a multi-player game;

identify a coefficient associated with the benchmark group of players, wherein the coefficient is a function, at least in part, of the delay time;

generate a first potential match of a first plurality of players to play as a group in a gameplay session of a multi-player game;

obtain a value of a match variable associated with the first plurality of players, wherein the match variable corresponds to the identified coefficient;

determine a first match score for the first potential match based on the value of the match variable and the identified coefficient; and determine whether to recommend the first potential match based on the first match score.

* * * * *